US011697308B2

(12) United States Patent
Uemura

(10) Patent No.: US 11,697,308 B2
(45) Date of Patent: Jul. 11, 2023

(54) RUN-FLAT TIRE

(71) Applicant: The Yokohama Rubber Co., LTD., Tokyo (JP)

(72) Inventor: Takanori Uemura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 295 days.

(21) Appl. No.: 16/956,525

(22) PCT Filed: Nov. 22, 2018

(86) PCT No.: PCT/JP2018/043265
§ 371 (c)(1),
(2) Date: Jun. 19, 2020

(87) PCT Pub. No.: WO2019/123973
PCT Pub. Date: Jun. 27, 2019

(65) Prior Publication Data
US 2022/0134804 A1 May 5, 2022

(30) Foreign Application Priority Data

Dec. 22, 2017 (JP) ................................ 2017-246764

(51) Int. Cl.
*B60C 9/18* (2006.01)
*B60C 9/20* (2006.01)
(Continued)

(52) U.S. Cl.
CPC ............... *B60C 9/20* (2013.01); *B60C 11/13* (2013.01); *B60C 17/0009* (2013.01);
(Continued)

(58) Field of Classification Search
CPC ......... B60C 11/0083; B60C 2011/0033; B60C 17/0009
See application file for complete search history.

(56) References Cited

U.S. PATENT DOCUMENTS 5,368,082 A * 11/1994 Oare ...................... B60C 15/04
152/549
5,524,686 A * 6/1996 Takada ................ B60C 11/0306
152/209.27
(Continued)

FOREIGN PATENT DOCUMENTS

CN 105682942 6/2016
CN 106794719 5/2017
(Continued)

OTHER PUBLICATIONS

Clark, Mechanics of Pneumatic Tires, Nov. 1971, p. 30. (Year: 1971).*
(Continued)

*Primary Examiner* — Cedrick S Williams
(74) *Attorney, Agent, or Firm* — Thorpe North & Western LLP

(57) ABSTRACT

A run-flat tire includes a belt reinforcing layer outward of a belt layer in a tire radial direction and reinforcing rubber in sidewall portions. Where a center region is a region of a tread portion in which a center land portion corresponding to a land portion included in land portions in a tread portion and located closest to a tire equatorial plane is positioned, the belt reinforcing layer includes a center reinforcing portion in which more pieces of the belt reinforcing layer are layered at a position of the center region than at positions other than the position of the center region, and in the belt reinforcing layer, a width Wc of the center reinforcing portion in a tire lateral direction with respect to a thickness Gr of the side reinforcing rubber at a tire maximum width position is within a range of $0.5\ Gr \le Wc \le 2.0\ Gr$.

18 Claims, 10 Drawing Sheets

(51) Int. Cl.
  *B60C 11/13* (2006.01)
  *B60C 17/00* (2006.01)
  *B60C 11/00* (2006.01)
  *B60C 11/03* (2006.01)

(52) U.S. Cl.
  CPC ............. *B60C 2009/2061* (2013.01); *B60C 2011/0025* (2013.01); *B60C 2011/0033* (2013.01); *B60C 2011/0348* (2013.01)

(56) References Cited

U.S. PATENT DOCUMENTS

| | | | |
|---|---|---|---|
| 6,672,351 B1 | 1/2004 | Gerresheim et al. | |
| 2005/0211361 A1* | 9/2005 | Nagahara | B60C 17/0009 152/554 |
| 2006/0162837 A1 | 7/2006 | Sakaguchi et al. | |
| 2007/0012391 A1* | 1/2007 | Willard | B60C 17/0009 152/455 |
| 2015/0251496 A1* | 9/2015 | Yamaguchi | B60C 9/18 152/209.18 |
| 2016/0257168 A1* | 9/2016 | Kuwayama | B60C 9/02 |
| 2016/0257169 A1 | 9/2016 | Kuwayama et al. | |
| 2016/0325588 A1* | 11/2016 | Okazaki | B60C 3/04 |
| 2017/0028782 A1* | 2/2017 | Miyake | B60C 9/20 |
| 2017/0297383 A1 | 10/2017 | Hatanaka et al. | |
| 2018/0272800 A1* | 9/2018 | Kuwayama | B60C 1/0016 |

FOREIGN PATENT DOCUMENTS

| | | | | |
|---|---|---|---|---|
| DE | 699 37 503 T2 | | 8/2000 | |
| EP | 3196050 B1 | * | 5/2022 | ............ B60C 11/00 |
| JP | 2001-080320 | | 3/2001 | |
| JP | 2003-341308 | | 12/2003 | |
| JP | 2004-322718 | | 11/2004 | |
| JP | 2004-359145 | | 12/2004 | |
| JP | 2006-199224 | | 8/2006 | |
| JP | 2006327256 A | * | 12/2006 | |
| JP | 2011-195046 | | 10/2011 | |
| JP | 4865259 | | 2/2012 | |
| JP | 2013-220718 | | 10/2013 | |
| JP | 2015-020467 | | 2/2015 | |
| WO | WO 2000/046047 A1 | | 8/2000 | |
| WO | WO 01/15917 | | 3/2001 | |
| WO | WO 2015/063972 | | 5/2015 | |
| WO | WO 2016/051651 | | 4/2016 | |

OTHER PUBLICATIONS

International Search Report for International Application No. PCT/JP2018/043265 dated Feb. 26, 2019, 4 pages, Japan.

* cited by examiner

| | Conventional Example | Comparative Example 1 | Comparative Example 2 | Example 1 |
|---|---|---|---|---|
| Presence of center reinforcing portion of belt reinforcing layer | No | Yes | Yes | Yes |
| Width Wc of center reinforcing portion with respect to thickness Gr of side reinforcing rubber | - | 0.4 | 3 | 1.3 |
| Average width of center reinforcing layer with respect to width of center land portion | - | 100% | 100% | 60% |
| Form of center reinforcing portion | - | Projecting outward | Projecting outward | Projecting outward |
| Average thickness of tread rubber layer: Tc/Tsh | 1.15 | 1.15 | 1.15 | 1.15 |
| Average Thickness Of Tread Rubber Layer: Tm/Tsh | 1.10 | 1.10 | 1.10 | 1.10 |
| Presence of protrusion-shaped land portion | No | No | No | No |
| Radius of curvature of protrusion-shaped land portion: RR/TR | - | - | - | - |
| Tg/Tc | 0.1 | 0.1 | 0.1 | 0.1 |
| Modulus of 300% elongation of tread rubber layer (MPa) | 9 | 9 | 9 | 9 |
| Presence of circumferential narrow groove | No | No | No | No |
| Presence of inward bulging portion of carcass layer | No | No | No | No |
| Shock burst resistance | 100 | 101 | 102 | 103 |
| Rolling resistance performance | 100 | 103 | 103 | 108 |
| Run-flat durability | 100 | 100 | 100 | 100 |

FIG. 10A

|  | Example 2 | Example 3 | Example 4 | Example 5 | Example 6 |
|---|---|---|---|---|---|
| Presence of center reinforcing portion of belt reinforcing layer | Yes | Yes | Yes | Yes | Yes |
| Width Wc of center reinforcing portion with respect to thickness Gr of side reinforcing rubber | 1.3 | 1.3 | 1.3 | 1.3 | 1.3 |
| Average width of center reinforcing layer with respect to width of center land portion | 45% | 45% | 45% | 45% | 45% |
| Form of center reinforcing portion | Projecting outward | Projecting inward | Projecting inward | Projecting inward | Projecting inward |
| Average thickness of tread rubber layer: Tc/Tsh | 1.15 | 1.15 | 1.95 | 1.6 | 1.6 |
| Average Thickness Of Tread Rubber Layer: Tm/Tsh | 1.10 | 1.10 | 1.50 | 1.30 | 1.30 |
| Presence of protrusion-shaped land portion | No | No | No | No | Yes |
| Radius of curvature of protrusion-shaped land portion: RR/TR | - | - | - | - | 0.05 |
| Tg/Tc | 0.1 | 0.1 | 0.1 | 0.1 | 0.1 |
| Modulus of 300% elongation of tread rubber layer (MPa) | 9 | 9 | 9 | 9 | 9 |
| Presence of circumferential narrow groove | No | No | No | No | No |
| Presence of inward bulging portion of carcass layer | No | No | No | No | No |
| Shock burst resistance | 103 | 106 | 110 | 108 | 111 |
| Rolling resistance performance | 112 | 110 | 105 | 112 | 110 |
| Run-flat durability | 100 | 100 | 100 | 100 | 100 |

FIG. 10B

|  | Example 7 | Example 8 | Example 9 | Example 10 |
|---|---|---|---|---|
| Presence of center reinforcing portion of belt reinforcing layer | Yes | Yes | Yes | Yes |
| Width Wc of center reinforcing portion with respect to thickness Gr of side reinforcing rubber | 1.3 | 1.3 | 1.3 | 1.3 |
| Average width of center reinforcing layer with respect to width of center land portion | 45% | 45% | 45% | 45% |
| Form of center reinforcing portion | Projecting inward | Projecting inward | Projecting inward | Projecting inward |
| Average thickness of tread rubber layer: Tc/Tsh | 1.6 | 1.6 | 1.6 | 1.6 |
| Average thickness of tread rubber layer: Tm/Tsh | 1.30 | 1.30 | 1.30 | 1.30 |
| Presence of protrusion-shaped land portion | Yes | Yes | Yes | Yes |
| Radius of curvature of protrusion-shaped land portion: RR/TR | 0.5 | 0.2 | 0.2 | 0.2 |
| Tg/Tc | 0.1 | 0.1 | 0.5 | 0.2 |
| Modulus of 300% elongation of tread rubber layer (MPa) | 9 | 9 | 9 | 9 |
| Presence of circumferential narrow groove | No | No | No | No |
| Presence of inward bulging portion of carcass layer | No | No | No | No |
| Shock burst resistance | 109 | 110 | 113 | 112 |
| Rolling resistance performance | 112 | 112 | 110 | 111 |
| Run-flat durability | 100 | 100 | 100 | 100 |

FIG. 10C

|  | Example 11 | Example 12 | Example 13 | Example 14 |
|---|---|---|---|---|
| Presence of center reinforcing portion of belt reinforcing layer | Yes | Yes | Yes | Yes |
| Width Wc of center reinforcing portion with respect to thickness Gr of side reinforcing rubber | 1.3 | 1.3 | 1.3 | 1.3 |
| Average width of center reinforcing layer with respect to width of center land portion | 45% | 45% | 45% | 45% |
| Form of center reinforcing portion | Projecting inward | Projecting inward | Projecting inward | Projecting inward |
| Average thickness of tread rubber layer: Tc/Tsh | 1.6 | 1.6 | 1.6 | 1.6 |
| Average thickness of tread rubber layer: Tm/Tsh | 1.30 | 1.30 | 1.30 | 1.30 |
| Presence of protrusion-shaped land portion | Yes | Yes | Yes | Yes |
| Radius of curvature of protrusion-shaped land portion: RR/TR | 0.2 | 0.2 | 0.2 | 0.2 |
| Tg/Tc | 0.2 | 0.2 | 0.2 | 0.2 |
| Modulus of 300% elongation of tread rubber layer (MPa) | 17 | 13 | 13 | 13 |
| Presence of circumferential narrow groove | No | No | Yes | Yes |
| Presence of inward bulging portion of carcass layer | No | No | No | Yes |
| Shock burst resistance | 111 | 113 | 114 | 115 |
| Rolling resistance performance | 111 | 111 | 112 | 112 |
| Run-flat durability | 100 | 100 | 100 | 100 |

FIG. 10D

RUN-FLAT TIRE

FIELD OF THE TECHNOLOGY

The present technology relates to a run-flat tire.

BACKGROUND

Pneumatic tires are assembled on rims, inflated with air, and mounted on a vehicle. When a vehicle is traveling, it is this internal air pressure that bears the load. However, upon puncture or the like, air escapes from the pneumatic tire rendering the tire unsuitable to bear the load. Specifically, the load supported by the air pressure becomes supported by the sidewall portions, causing the sidewall portions to greatly deform. As a result, travel is impeded. Thus, run-flat tires are known as pneumatic tires that allow a vehicle to travel with air escaping from the tires due to a puncture or the like, in other words, to perform what is called run-flat traveling. The run-flat tires are provided with side reinforcing rubber inside the sidewall portions to increase the bending rigidity of the sidewall portions. In other words, even in a case where escape of the air from the run-flat tires inflated causes a heavy load to act on the sidewall portions, the run-flat tires are enabled to travel by suppressing deformation of the sidewall portions.

The run-flat tires including the side reinforcing rubber as described above can perform run-flat traveling even in a case where the air in the run-flat tires inflated escapes. However, the steering stability in this case is poorer than the steering stability obtained in a case where the run-flat tires are inflated to an internal pressure. Thus, some known run-flat tires ensure steering stability during run-flat traveling. For example, in a run-flat tire described in Japan Unexamined Patent Publication No. 2003-341308, the steering stability during run-flat traveling is improved by disposing, in the tread portion, a suppressing member for suppressing a tread lift.

In addition, a tread portion of a pneumatic tire such as a run-flat tire may be damaged due to treading of a projection such as a stone on a road surface during traveling of the vehicle. This may cause a shock burst. Thus, some known pneumatic tires have improved durability against such a projection. For example, a pneumatic tire described in Japan Patent No. 4865259 includes two belt protecting layers disposed outward of a belt layer in the tire radial direction, and one of the belt protecting layers disposed outward in the tire radial direction is narrower than the other belt protecting layer on the inner side in the tire radial direction to improve projection resistance performance.

Here, the run-flat tire includes the side reinforcing rubber disposed inward of the sidewall portions to enable traveling in an internal-pressure uninflated state, whereas the run-flat tire has increased rigidity at the sidewall portions and is thus susceptible to a shock burst in a normal internal pressure state. That is, in a typical pneumatic tire with no side reinforcing rubber, in a case where a projection is treaded by the tread portion, the sidewall portion is deflected as well as the tread portion to enable a reduction in pressure acting on the tread portion from the projection. However, in the run-flat tire, the increased rigidity of the sidewall portions makes the sidewall portions less likely to deflect in a case where the projection is treaded by the tread portion. Thus, a reduction in load imposed on the tread portion from the projection is more difficult in a case where the projection is treaded by the run-flat tire than in a case where the projection is treaded by a typical pneumatic tire.

Additionally, in the run-flat tire, the side reinforcing rubber is disposed inward of the sidewall portions, and the sidewall portions have a greater volume than the sidewall portions of a typical pneumatic tire. Thus, an energy loss during tire rotation is increased, leading to increased rolling resistance.

Reduced rigidity of the sidewall portions allows improvement of shock burst resistance, corresponding to performance against shock bursts, and a reduction in rolling resistance. However, the reduced rigidity of the sidewall portions facilitates deflection of the sidewall portions during run-flat traveling, and the sidewall portions are repeatedly deflected while being subjected to heavy loads, and may be likely to be broken. Thus, it has been very difficult to improve the shock burst resistance performance and also reduce the rolling resistance without degrading the durability during run-flat traveling.

SUMMARY

The present technology provides a run-flat tire that can provide improvement of the shock burst resistance performance with the run-flat durability ensured and further a reduction in rolling resistance.

A run-flat tire according to an embodiment of the present technology includes a tread portion, sidewall portions disposed on opposite sides of the tread portion in a tire lateral direction, a belt layer disposed in the tread portion, a belt reinforcing layer disposed outward of the belt layer in a tire radial direction, a tread rubber layer disposed outward, in the tire radial direction, of the belt reinforcing layer in the tread portion, and side reinforcing rubber disposed in each of the sidewall portions and including tire radial direction outer end portions located inward of the belt layer in the tire radial direction, the tread portion being provided with a main groove extending in a tire circumferential direction and defining a plurality of land portions, and assuming that a center region is a region where a center land portion corresponding to the land portion included in the land portions in the tread portion and located closest to a tire equatorial plane is positioned and that shoulder regions are each a region between the corresponding tire radial direction outer end portion of the side reinforcing rubber and a corresponding end portion of the belt layer in the tire lateral direction and that intermediate regions are each a region between the center region and the shoulder region, the belt reinforcing layer including a center reinforcing portion located at a position of the center region and in which more pieces of the belt reinforcing layer are layered than at positions other than the position of the center region, and in the belt reinforcing layer, a width Wc of the center reinforcing portion in the tire lateral direction with respect to a thickness Gr of the side reinforcing rubber at a tire maximum width position being within a range of $0.5\ Gr \leq Wc \leq 2.0\ Gr$.

Preferably, in the run-flat tire described above, in the belt reinforcing layer, an average width of the width Wc of the center reinforcing portion is less than 50% of a width of the center land portion in the tire lateral direction.

Preferably, in the run-flat tire described above, the belt reinforcing layer is formed such that the center reinforcing portion projects inward in the tire radial direction.

Preferably, in the run-flat tire described above, in the tread portion, a relationship between an average thickness Tc of the tread rubber layer located outward, in the tire radial direction, from the belt reinforcing layer in the center region, an average thickness Tsh of the tread rubber layer located outward, in the tire radial direction, from the belt reinforcing layer in the shoulder regions, and an average thickness Tm of the tread rubber layer located outward, in the tire radial direction, from the belt reinforcing layer in the intermediate regions is within a range of $1.2 \leq (Tc/Tsh) \leq 1.9$ and satisfies a relationship $Tc \geq Tm > Ts$.

Preferably, in the run-flat tire described above, at least one of the land portions located in the center region and the intermediate regions is formed as a protrusion-shaped land portion for which a relationship between a thickness CGe at an end portion position of the land portion in the tire lateral direction and a thickness CGc at a central position of the land portion in the tire lateral direction is $CGc > CGe$.

Preferably, in the run-flat tire described above, the protrusion-shaped land portion is formed in an arc shape in which a ground contact surface representing an outer contour line in a tire meridian cross-sectional view bulges outward in the tire radial direction, and a relationship between a radius of curvature RR of the arc and a radius of curvature TR of an arc forming a tread profile is within a range of $0.1 \leq (RR/TR) \leq 0.4$.

Preferably, in the run-flat tire described above, in the tread portion, a relationship between a minimum thickness Tg of a rubber thickness between the belt reinforcing layer and a groove bottom of the main groove defining the center land portion and the average thickness Tc of the tread rubber layer located outward, in the tire radial direction, from the belt reinforcing layer in the center region is within a range of $0.12 \leq (Tg/Tc) \leq 0.4$.

Preferably, in the run-flat tire described above, a portion of rubber forming the tread rubber layer which portion is contained in the center region is 10 MPa or more and 16 MPa or less in modulus of 300% elongation.

Preferably, in the run-flat tire described above, a circumferential narrow groove extending in the tire circumferential direction is formed in at least one of the shoulder regions located on opposite sides in the tire lateral direction.

Preferably, the run-flat tire described above includes at least one carcass layer, and a portion of the carcass layer located in the shoulder region bulges toward a tire inner surface in an internal-pressure uninflated state.

The run-flat tire according to an embodiment of the present technology has an effect that allows improvement of the shock burst resistance performance with the run-flat durability ensured and that further enables a reduction in rolling resistance.

BRIEF DESCRIPTION OF THE DRAWINGS

FIGS. 10A-10D are tables showing the results of performance evaluation tests of run-flat tires.

DETAILED DESCRIPTION

Figure 1:
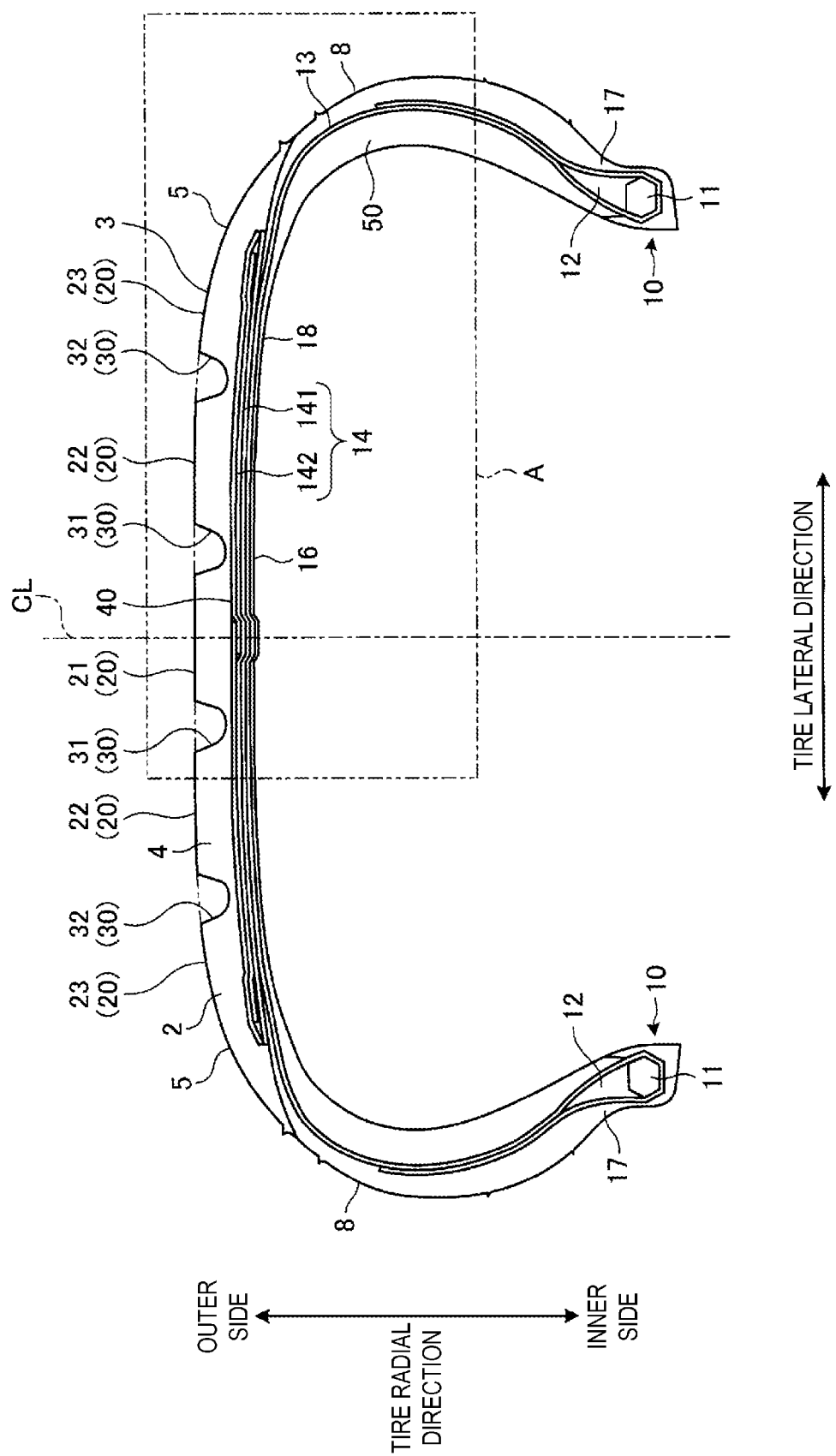
FIG. 1 is a meridian cross-sectional view illustrating a run-flat tire according to a first embodiment of the present technology.

Embodiments of a run-flat tire according to the present technology will be described in detail below with reference to the drawings. However, the present technology is not limited by the embodiment. Constituents of the following embodiments include elements that are substantially identical or that can be substituted and easily conceived by one skilled in the art.

First Embodiment

Hereinafter, "tire radial direction" refers to a direction orthogonal to a rotation axis (not illustrated in the drawings) of a run-flat tire 1 (run-flat tire). "Inward in the tire radial direction" refers to the direction toward the rotation axis in the tire radial direction. "Outward in the tire radial direction" refers to the direction away from the axis of rotation in the tire radial direction. "Tire circumferential direction" refers to the circumferential direction with the rotation axis as the center axis. Additionally, "tire lateral direction" refers to a direction parallel with the rotation axis. "Inward in the tire lateral direction" refers to a direction toward a tire equatorial plane (tire equator line) CL in the tire lateral direction. "Outward in the tire lateral direction" refers to a direction away from the tire equatorial plane CL in the tire lateral direction. "Tire equatorial plane CL" refers to a plane that is orthogonal to the rotation axis of the run-flat tire 1 and that passes through the center of the tire width of the run-flat tire 1. The position of the tire equatorial plane CL in the tire lateral direction coincides with a tire lateral direction center line corresponding to a central position of the run-flat tire 1 in the tire lateral direction. "Tire width" is the width in the tire lateral direction between components located outermost in the tire lateral direction, or in other words, the distance between the components that are the most distant from the tire equatorial plane CL in the tire lateral direction. "Tire equator line" refers to the line in the tire circumferential direction of the run-flat tire 1 that lies on the tire equatorial plane CL.

FIG. 1 is a meridian cross-sectional view of a run-flat tire 1 according to a first embodiment. In the run-flat tire 1 illustrated in FIG. 1, in a tire meridian cross-sectional view, a tread portion 2 is disposed in an outermost portion in the tire radial direction, and includes a tread rubber layer 4 formed of a rubber composition. Additionally, a surface of the tread portion 2, that is, a portion of the run-flat tire 1 that comes into contact with a road surface during traveling of a vehicle (not illustrated in the drawings) mounted with the run-flat tire 1, is formed as a ground contact surface 3, which forms a part of contour of the run-flat tire 1. The ground contact surface 3 of the tread portion 2 is provided with a plurality of main grooves 30 extending in the tire circumferential direction. The main grooves 30 define a plurality of land portions 20 in the surface of the tread portion 2. In the first embodiment, four main grooves 30 are formed side by side in the tire lateral direction, and two of the four main grooves 30 are disposed on each of opposite sides of the tire equatorial plane CL in the tire lateral direction. In other words, the tread portion 2 is provided with a total of four main grooves 30 including two center main grooves 31 disposed on the opposite sides of the tire equatorial plane CL and two shoulder main grooves 32 disposed outward, in the tire lateral direction, of each of the two center main grooves 31.

Note that "main groove 30" refers to a longitudinal groove that extends at least partially in the tire circumferential direction. In general, the main groove 30 has a groove width of 3 mm or more and a groove depth of 4.5 mm or more, and internally includes a tread wear indicator (skid sign) that indicates terminal stages of wear. In the first embodiment, the main groove 30 has a groove width of 5 mm or more and 17 mm or less and a groove depth of 6 mm or more and 9 mm or less, and is substantially parallel with the tire equator line (center line) where the tire equatorial plane CL and the ground contact surface 3 intersect. The main grooves 30 may extend linearly in the tire circumferential direction, or may be provided in a wave-like shape or a zigzag shape.

A center land portion 21 corresponds to the land portion 20 included in the land portions 20 defined by the main grooves 30 and located between the two center main grooves 31 and on the tire equatorial plane CL. Additionally, second land portions 22 each correspond to the land portion 20 located between the center main groove 31 and the shoulder main groove 32 that are adjacent to each other and disposed outward of the center land portion 21 in the tire lateral direction. Additionally, shoulder land portions 23 each correspond to the land portion 20 located outward of the second land portion 22 in the tire lateral direction and adjacent to the second land portion 22 via the shoulder main groove 32.

Note that the land portions 20 may be formed in a rib shape extending around one circumference of the tire in the tire circumferential direction and that, by forming, in the tread portion 2, a plurality of lug grooves (not illustrated) extending in the tire lateral direction, the land portions 20 may be defined by the main grooves 30 and the lug grooves, with the land portions 20 formed in blocks. In the first embodiment, the land portion 20 is formed as a rib-like land portion 20 formed around one circumference of the tire in the circumferential direction.

Additionally, shoulder portions 5 are located at both outer ends of the tread portion 2 in the tire lateral direction, and sidewall portions 8 are each disposed inward of the shoulder portion 5 in the tire radial direction. In other words, the sidewall portion 8 is disposed on both sides of the tread portion 2 in the tire lateral direction. In other words, the sidewall portions 8 are disposed at two positions on the opposite sides of the run-flat tire 1 in the tire lateral direction, and form portions of the run-flat tire 1 exposed outermost in the tire lateral direction.

Bead portions 10 are each located inward, in the tire radial direction, of the corresponding one of the sidewall portions 8 located on the opposite sides in the tire lateral direction. Similar to the sidewall portions 8, the bead portions 10 are disposed at two positions on the opposite sides of the tire equatorial plane CL, that is, the bead portions 10 in a pair are disposed on opposite sides of the tire equatorial plane CL in the tire lateral direction. Each of the bead portions 10 is provided with a bead core 11, and a bead filler 12 is provided outward of the bead core 11 in the tire radial direction. The bead core 11 is an annular member formed by winding, in a ring shape, a bead wire including a steel wire, and the bead filler 12 is a rubber member disposed outward of the bead core 11 in the tire radial direction.

Additionally, a belt layer 14 is provided inward of the tread portion 2 in the tire radial direction. The belt layer 14 has a multilayer structure in which at least two cross belts 141 and 142 are layered. The cross belts 141 and 142 are formed by coating, with coating rubber, a plurality of belt cords made of steel or an organic fiber material such as polyester, rayon, or nylon, and performing a rolling process on the coating rubber-covered belt cords, and the cross belts 141 and 142 have a belt angle within a predetermined range (for example, of 20° or more and 55° or less), the belt angle being defined as the inclination angle of each belt cord with respect to the tire circumferential direction. Additionally, the two cross belts 141 and 142 are different from each other in belt angle. Thus, the belt layer 14 is what is called a crossply structure in which the two cross belts 141 and 142 are layered with the inclination directions of the belt cords intersecting each other.

A belt reinforcing layer 40 is disposed outward of the belt layer 14 in the tire radial direction. The belt reinforcing layer 40 is disposed outward of the belt layer 14 in the tire radial direction to cover the belt layer 14 in the tire circumferential direction. The belt reinforcing layer 40 is formed of coating rubber-covered cords (not illustrated) disposed side by side in the tire lateral direction and substantially parallel to the tire circumferential direction. The cords of the belt reinforcing layer 40 are made of steel or organic fibers such as polyester, rayon, or nylon, and the angle of the cords is within a range of ±5° with respect to the tire circumferential direction. In addition, each of the cords of the belt reinforcing layer 40 has a wire diameter of 0.4 mm or more and 1.0 mm or less and a cord count of 30 or more and 45 or less per 50 mm in the direction in which the cords are arranged. In the first embodiment, the belt reinforcing layer 40 is disposed all over the region in the tire lateral direction in which the belt layer 14 is disposed, and covers the end portions of the belt layer 14 in the tire lateral direction. The tread rubber layer 4 of the tread portion 2 is disposed outward, in the tire radial direction, of the belt reinforcing layer 40 in the tread portion 2.

A carcass layer 13 containing cords of radial plies is continuously provided inward of the belt layer 14 in the tire radial direction and in a portion of the sidewall portion 8 closer to the tire equatorial plane CL. The carcass layer 13 has a single layer structure made of one carcass ply or a multilayer structure made of a plurality of carcass plies, and extends between the pair of bead portions 10 on the opposite sides in the tire lateral direction in a toroidal form, forming the backbone of the tire. Specifically, the carcass layer 13 is disposed from one bead portion 10 to the other bead portion 10 of the pair of bead portions 10 located on either side in the tire lateral direction, and turns back outward in the tire lateral direction along the bead cores 11 at the bead portions 10, wrapping around the bead cores 11 and the bead fillers 12. The bead filler 12 is a rubber material disposed in a space formed outward of the bead core 11 in the tire radial direction by folding back the carcass layer 13 at the bead portion 10. Additionally, the belt layer 14 is disposed in the carcass layer 13 extending between the pair of bead portions 10 and outward, in the tire radial direction, of a portion of the carcass layer 13 located in the tread portion 2. Additionally, the carcass plies in the carcass layer 13 are made by coating, with coating rubber, a plurality of carcass cords made of steel or an organic fiber material such as nylon, polyester, or rayon and performing a rolling process on the coating rubber-covered carcass cords. A plurality of carcass cords forming carcass plies are disposed side by side forming a certain angle with respect to the tire circumferential direction along the tire meridian direction.

A rim cushion rubber 17 is disposed radially inward and laterally outward of the bead core 11 and turned back portion of the carcass layer 13 at the bead portion 10. The rim cushion rubber 17 is the contact surface of the bead portion 10 against the rim flange. Additionally, an innerliner 16 is formed inward of the carcass layer 13 or inward of the carcass layer 13 in the run-flat tire 1, along the carcass layer 13. The innerliner 16 forms a tire inner surface 18 corresponding to an inner surface of the run-flat tire 1.

Furthermore, side reinforcing rubber 50 is disposed in the sidewall portions 8. The side reinforcing rubber 50 is a rubber member provided inside the sidewall portions 8, and is disposed without being exposed from the tire inner surface or the tire outer surface. Specifically, the side reinforcing rubber 50 is located mainly inward, in the tire lateral direction, of portions of the carcass layer 13 located at the sidewall portions 8. In each sidewall portion 8, and the side reinforcing rubber 50 is disposed between the carcass layer 13 and the innerliner 16, and is shaped like a crescent such that the shape of the side reinforcing rubber 50 in a meridian cross-section of the run-flat tire 1 projects outward in the tire lateral direction.

The side reinforcing rubber 50 shaped like a crescent includes outer end portions 51 corresponding to tire radial direction outer end portions and located inward, in the tire radial direction, of the belt layer 14 in the tread portion 2, and the side reinforcing rubber 50 and the belt layer 14 are disposed partially overlapping with each other in the tire radial direction by a predetermined range of amount of overlap. The side reinforcing rubber 50 thus disposed is formed of a rubber material having a higher strength than the rubber forming the sidewall portions 8 and the rim cushion rubber 17 disposed in the bead portions 10.

Figure 2:
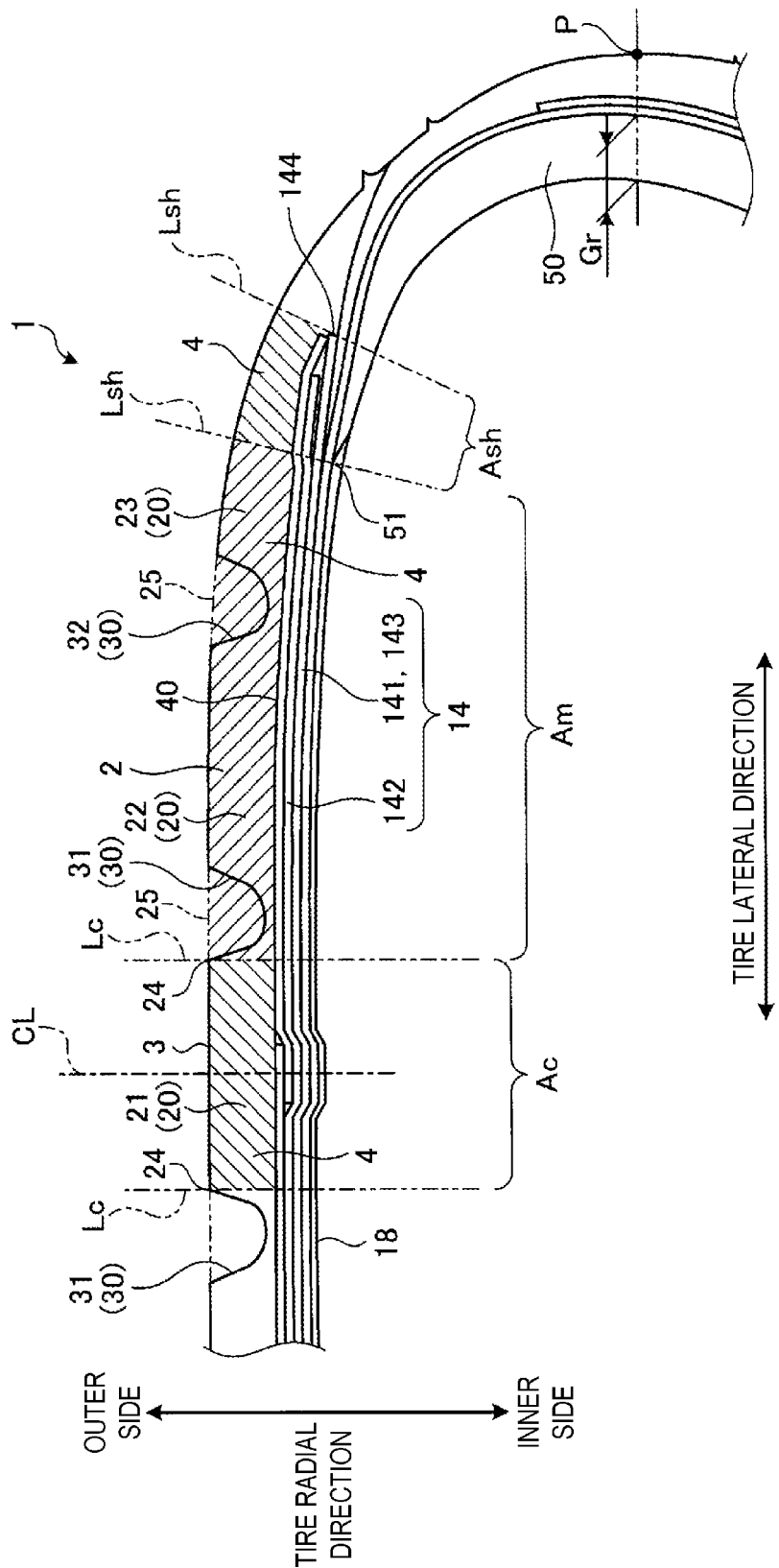
FIG. 2 is a detailed view of portion A of FIG. 1.
Figure 3:
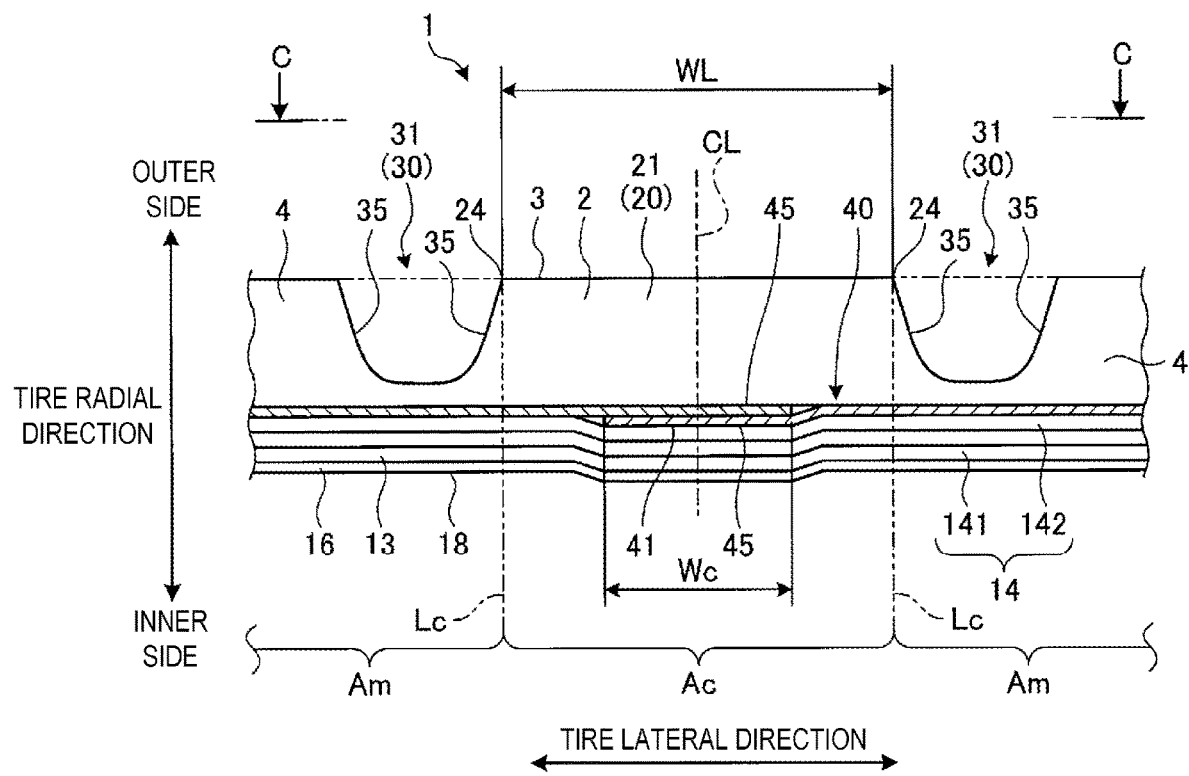
FIG. 3 is a detailed view of a center region of the tread portion illustrated in FIG. 2.

FIG. 2 is a detailed view of a portion A of FIG. 1. FIG. 3 is a detailed view of a center region Ac of the tread portion 2 illustrated in FIG. 2. Assuming that the tread portion 2 includes the center region Ac located in the center of the tread portion 2 in the tire lateral direction, shoulder regions Ash located at opposite ends of the tread portion 2 in the tire lateral direction, and intermediate regions Am each located between the center region Ac and the corresponding shoulder region Ash, a relative relationship between the tire average thicknesses of the tread rubber layer 4 in the respective regions satisfies a predetermined relationship. Among these regions, the center region Ac is a region where the center land portion 21 included in the land portions 20 and located closest to the tire equatorial plane CL is positioned. Specifically, in a meridian cross-sectional view of the run-flat tire 1, assuming that center region boundary lines Lc are each a line extended perpendicularly to the tire inner surface 18 from an intersection point 24 between a portion of the groove wall 35 of the center main groove 31 defining the center land portion 21 which portion is located closer to the center land portion 21 and the ground contact surface 3 representing an outer contour line of the center land portion 21 located outward in the tire radial direction, the center region Ac corresponds to a region located between the two center region boundary lines Lc located on the opposite sides of the center land portion 21 in the tire lateral direction.

Note that when the center main groove 31 undulates in the tire lateral direction by bending or curving in the tire lateral direction while extending in the tire circumferential direction, the center region Ac is defined in the widest range in the tire lateral direction. In other words, in a case where the center main groove 31 undulates in the tire lateral direction, the center region boundary lines Lc defining the center region Ac each correspond to a line extended, perpendicularly to the tire inner surface 18, from the intersection point 24 between the ground contact surface 3 and a portion of the groove wall 35 of the center main groove 31 defining the center land portion 21 which portion is located outermost in the tire lateral direction on the tire circumferential direction.

Additionally, the shoulder region Ash is a region between the corresponding outer end portion 51 of the side reinforcing rubber 50 and a corresponding end portion 144 of the belt layer 14 in the tire lateral direction. Specifically, in a meridian cross-section view of the run-flat tire 1, assuming that shoulder region boundary lines Lsh correspond to lines extended, perpendicularly to the tire inner surface 18, from the end portion 144 of a widest belt 143 included in the plurality of cross belts 141 and 142 of the belt layer 14 and having the largest width in the tire lateral direction and from the outer end portion 51 of the side reinforcing rubber 50, the shoulder region Ash corresponds to a region located between the two shoulder region boundary lines Lsh. The shoulder regions Ash defined as described above are defined by the opposite sides the tire equatorial plane CL in the tire lateral direction, and are located on the opposite sides of the tire equatorial plane CL in the tire lateral direction.

In the first embodiment, the cross belt 141 included in the two cross belts 141 and 142 of the belt layer 14 and located inward in the tire radial direction is larger than the other cross belt 142 in width in the tire lateral direction, and the cross belt 141 located inward in the tire radial direction corresponds to the widest belt 143.

Additionally, the intermediate region Am is a region between the center region Ac and the shoulder region Ash. In other words, the intermediate region Am is located on both sides of the center region Ac in the tire lateral direction, the boundary of the intermediate region Am located inward in the tire lateral direction is defined by the center region boundary line Lc, and the boundary of the intermediate region Am located outward in the tire lateral direction is defined by the shoulder region boundary line Lsh.

The center region Ac, the shoulder regions Ash, and the intermediate regions Am are specified to have shapes obtained with the run-flat tire 1 mounted on a regular rim and inflated to a regular internal pressure. Here, "regular rim" refers to a "standard rim" defined by JATMA (Japan Automobile Tyre Manufacturers Association, Inc.), a "Design Rim" defined by TRA (The Tire and Rim Association, Inc.), or a "Measuring Rim" defined by ETRTO (European Tire and Rim Technical Organization). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

Additionally, the average thickness of the tread rubber layer 4 in the center region Ac, the shoulder regions Ash, and the intermediate regions Am is an average thickness in each region in a case where the distance between the belt reinforcing layer 40 and the ground contact surface 3 is assumed as the thickness of the tread rubber layer 4. In other words, the average thickness Tc of the tread rubber layer 4 in the center region Ac is the average value of the distance from the ground contact surface 3 to the belt reinforcing layer 40 in the center region Ac, and the average thickness Tsh of the tread rubber layer 4 in the shoulder regions Ash is the average value of the distance from the ground contact surface 3 to the belt reinforcing layer 40 in the shoulder regions Ash, and the average thickness Tm of the tread rubber layer 4 in the intermediate regions Am is the average value of the distance from the ground contact surface 3 to the belt reinforcing layer 40 in the intermediate regions Am.

Note that while the center main groove 31 and the shoulder main groove 32 are located in the intermediate regions Am of the tread portion 2 but that the average thickness Tm of the tread rubber layer 4 in the intermediate regions Am is calculated on the assumption that these main grooves 30 are not present. In other words, for the thickness of the tread rubber layer 4 at the position of the main groove 30, the average thickness Tm of the tread rubber layer 4 in the intermediate regions Am is calculated with a distance from the imaginary line 25 to the belt reinforcing layer 40 considered as the thickness of the tread rubber layer 4 at the position of the main groove 30, the imaginary line 25 being obtained by extending, over the main groove 30, the ground contact surface 3 of the land portions 20 on the opposite sides of the main groove 30 in the tire lateral direction.

The average thickness of the tread rubber layer 4 in each region may be calculated, for each of the center region Ac, the shoulder regions Ash, and the intermediate regions Am of the tread portion 2 in the meridian cross-section of the run-flat tire 1, by dividing the cross-sectional area of the tread rubber layer 4 in the region by the width of the region. For example, the average thickness Tc of the tread rubber layer 4 of the center region Ac is calculated by dividing the cross-sectional area of the tread rubber layer 4 located in the center region Ac by the distance between two center region boundary lines Lc defining the center region Ac. In a case where the two center region boundary lines Lc are inclined with respect to each other, the average thickness Tc of the tread rubber layer 4 in the center region Ac is calculated by dividing the cross-sectional area of the tread rubber layer located in the center region Ac by the distance at an intermediate position between the position of the ground contact surface 3 and the position of the belt reinforcing layer 40 on each center region boundary line Lc. The average thickness Tsh of the tread rubber layer 4 in the shoulder regions Ash and the average thickness Tm of the tread rubber layer 4 in the intermediate regions Am are similarly calculated by dividing the cross-sectional area of the tread rubber layer 4 located in each of the regions by the distance between the shoulder region boundary lines Lsh defining the region or the distance between the center region boundary line Lc and the shoulder region boundary line Lsh.

In other words, in the tread portion 2, a relationship between the average thickness Tc of the tread rubber layer 4 located outward, in the tire radial direction, from the belt reinforcing layer 40 in the center region Ac and the average thickness Tsh of the tread rubber layer 4 located outward, in the tire radial direction, from the belt reinforcing layer 40 in the shoulder regions Ash, calculated as described above, is within a range of 1.2≤(Tc/Tsh)≤1.9. Furthermore, in the tread portion 2, for the average thickness Tc of the tread rubber layer 4 located outward, in the tire radial direction, from the belt reinforcing layer 40 in the center region Ac, the average thickness Tsh of the tread rubber layer 4 located outward, in the tire radial direction, from the belt reinforcing layer 40 in the shoulder regions Ash, and the average thickness Tm of the tread rubber layer 4 located outward, in the tire radial direction, from the belt reinforcing layer 40 in the intermediate regions Am, a relationship Tc≥Tm>Ts is satisfied. Note that, in FIG. 2, the tread rubber layer 4 in each of the regions is hatched. Additionally, a relationship between the average thickness Tc of the tread rubber layer 4 in the center region Ac and the average thickness Tsh of the tread rubber layer 4 in the shoulder regions Ash is preferably within a range of 1.4≤(Tc/Tsh)≤1.7.

In addition, at least a portion of the rubber forming the tread rubber layer 4 that is contained in the center region Ac is 10 MPa or more and 16 MPa or less in modulus of 300% elongation. Note that the modulus of 300% elongation is measured in a tensile test at 23° C. in conformance with JIS (Japanese Industrial Standard) K6251 (using dumbbell No. 3) and indicates tensile stress at 300% elongation.

Figure 4:
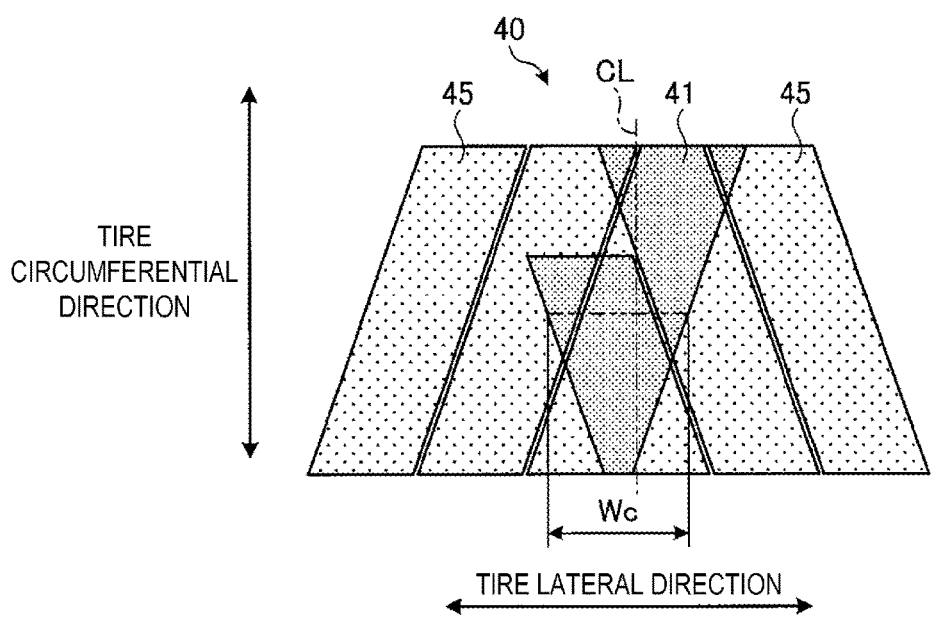
FIG. 4 is a schematic view of a belt reinforcing layer in the direction of arrow C-C in FIG. 3.

FIG. 4 is a schematic view of the belt reinforcing layer 40 in the direction of arrow C-C in FIG. 3. Additionally, the belt reinforcing layer 40, disposed outward of the belt layer 14 in the tire radial direction, is provided by winding, in the tire circumferential direction, a band-like member 45 formed in a band shape and having, for example, a width of approximately 10 mm. The band-like member 45 is used as a reinforcing layer constituent member forming the belt reinforcing layer 40, and is formed by coating, with coating rubber, the cords forming the belt reinforcing layer 40. In other words, the belt reinforcing layer 40 is disposed by spirally winding the band-like member 45, used as the reinforcing layer constituent member, outward of the belt layer 14 in the tire radial direction. At this time, the band-like member 45 is wound in one layer at a position located inward, in the tire radial direction, of the second land portions 22 and the shoulder land portions 23, while being wound in two layers overlapping in the tire radial direction, at a position located inward of the center land portion 21 in the tire radial direction. In other words, the band-like member 45 is spirally wound without overlapping in the tire radial direction at the position located inward of the second land portions 22 and the shoulder land portions 23, while being wound in such a manner as to overlap the band-like member 45 itself in the tire radial direction at the position located inward of the center land portion 21 in the tire radial direction. Thus, the belt reinforcing layer 40 includes the center reinforcing portion 41 located at the position of the center region Ac where more pieces of the band-like member 45 are layered than at the positions other than the position of the center region Ac.

As described above, the belt reinforcing layer 40 including the center reinforcing portion 41 is formed such that the center reinforcing portion 41 projects inward in the tire radial direction. That is, in the band-like member 45 in which more pieces of the band-like member 45 are layered at the position of the center region Ac than at the positions other than the position of the center region Ac, the increased number of pieces of the band-like member 45 located at the position of the center region Ac are layered inward, in the tire radial direction, with respect to the remaining part of the band-like member 45.

In the first embodiment, a pair of band-like members 45 is used as the belt reinforcing layer 40, one of the band-like members 45 is disposed on one side, in the tire lateral direction, of a tire equatorial plane CL region, and the other band-like member 45 is disposed on the other side, in the tire lateral direction, of the tire equatorial plane CL region. The band-like members 45 forming the pair are disposed across the tire equatorial plane CL. The band-like members 45 are disposed in a spiral shape centered at a tire rotation axis and extend from the tire equatorial plane CL region toward different end portions in the tire lateral direction. In other words, one of the band-like members 45 is spirally wound outward of the belt layer 14 in the tire radial direction of the belt layer 14 from the tire equatorial plane CL region toward one of the end portions 144 of the belt reinforcing layer 40, and the other band-like member 45 is spirally wound outward of the belt layer 14 in the tire radial direction extending from the tire equatorial plane CL region toward the other end 144 of the belt reinforcing layer 40.

Additionally, the directions of the spirals of the respective band-like members 45 forming a pair are opposite to each other, that is, the band-like members 45 forming a pair and each spirally wound are inclined in opposite directions along the tire lateral direction while extending in the same direction along the tire circumferential direction. Furthermore, in a portion of the belt reinforcing layer 40 in which the band-like members 45 overlap with each other at or near the tire equatorial plane CL, one of the band-like members 45 is placed on top of and inward, in the tire radial direction, of the other band-like member 45, and thus the band-like members 45 forming a pair are layered at or near the tire equatorial plane CL. The portion of the belt reinforcing layer 40 in which the band-like members 45 are layered as described above forms the center reinforcing portion 41, and the center reinforcing portion 41 is located in the center region Ac.

Here, the band-like members 45 forming a pair are each spirally wound in such a manner as to incline in opposite directions along the tire lateral direction while extending in the same direction along the tire circumferential direction. Thus, the portion of the pair of band-like members 45 in which the band-like members 45 overlap with each other has a width in the tire lateral direction that varies depending on a position in the tire circumferential direction. Thus, the center reinforcing portion 41 also has a width in the tire lateral direction that varies depending on the position in the tire circumferential direction. In the belt reinforcing layer 40, with respect to a thickness Gr (see FIG. 2) of the side reinforcing rubber 50 at a tire maximum width position P of the run-flat tire 1, the width Wc of the center reinforcing portion 41 in the tire lateral direction, which width varies depending on the position in the tire circumferential direction as described above, is within a range of $0.5 \text{ Gr} \leq \text{Wc} \leq 2.0 \text{ Gr}$, at any position in the tire circumferential direction. Note that a relationship between the width Wc of the center reinforcing portion 41 in the tire lateral direction and the thickness Gr of the side reinforcing rubber 50 at the tire maximum width position P of the run-flat tire 1 is preferably within a range of $0.7 \text{ Gr} \leq \text{Wc} \leq 1.5 \text{ Gr}$.

In this case, the tire maximum width position P is a position in the tire radial direction at a position where the dimension of the run-flat tire 1 in the tire lateral direction excluding a structure protruding from the surface of the sidewall portion 8 is largest in an unloaded state in which the run-flat tire 1 is mounted on a regular rim and inflated to the regular internal pressure under no load. The thickness Gr of the side reinforcing rubber 50 at the tire maximum width position P of the run-flat tire 1 corresponds to the thickness of the side reinforcing rubber 50 at the position of the tire maximum width position P in the tire radial direction specified as described above.

Furthermore, in the belt reinforcing layer 40, the average width of the width Wc of the center reinforcing portion 41 is less than 50% of the width WL of the center land portion 21 in the tire lateral direction. In other words, the width Wc of the center reinforcing portion 41 in the tire lateral direction varies depending on the position in the tire circumferential direction, and the average width of the width Wc of the center reinforcing portion 41 in the tire lateral direction around one circumference of the belt reinforcing layer 40 is less than 50% of the width WL of the center land portion 21 in the tire lateral direction.

In a case where the run-flat tire 1 according to the first embodiment is mounted on a vehicle, the run-flat tire 1 is mounted on a rim wheel R (see FIG. 5) by fitting the rim wheel R to the bead portion 10, and is inflated by air before being mounted on the vehicle. In a case where the vehicle equipped with the run-flat tire 1 travels, the run-flat tire 1 rotates with a portion of the ground contact surface 3 located below coming into contact with the road surface. The vehicle travels by transferring a driving force and a braking force to the road surface or generating a turning force due to the frictional force between the ground contact surface 3 and the road surface.

In a case where the run-flat tire 1 according to the first embodiment is mounted on a vehicle, the run-flat tire 1 is mounted on a rim wheel R (see FIG. 5) by fitting the rim wheel R to the bead portion 10, and is inflated by air before being mounted on the vehicle. In a case where the vehicle equipped with the run-flat tire 1 travels, the run-flat tire 1 rotates with a portion of the ground contact surface 3 located below coming into contact with the road surface. The vehicle travels by transferring a driving force and a braking force to the road surface or generating a turning force due to the frictional force between the ground contact surface 3 and the road surface. For example, in a case where driving force is transferred to the road surface, power generated by a prime mover such as an engine of the vehicle, is transferred to the rim wheel R, transferred from the rim wheel R to the bead portion 10, and then transferred to the run-flat tire 1.

While the run-flat tire 1 is in use, loads in various directions act on each component as described above, and these loads are borne by the pressure of the air with which the run-flat tire 1 is filled, the carcass layer 13 provided as a backbone of the run-flat tire 1, and the like. For example, the load acting in the tire radial direction between the tread portion 2 and the bead portion 10 due to the weight of the vehicle and the recesses and protrusions of the road surface is mainly borne by the pressure of the air with which the run-flat tire 1 is internally filled or by deflection of the sidewall portion 8 and the like. In other words, the air with which the run-flat tire 1 is internally filled acts as a force that acts to push the run-flat tire 1 outward from the inside. In a case where the vehicle travels, during traveling, the run-flat tire 1 is subjected to a heavy load imposed by biasing force acting outward from the inside and exerted by the air with which the run-flat tire is internally filled as described above, or the sidewall portions 8 and the like are appropriately deflected. The vehicle can thus travel with riding comfort ensured.

Here, the air may escape from inside the run-flat tire 1 in a case where, for example, a foreign material is stuck through the ground contact surface 3, leading to a puncture. Escape of the internal air reduces the air pressure to decrease the biasing force acting outward from the inside of the run-flat tire 1 and exerted by the air, thus impeding the load during traveling of the vehicle from being borne by the air pressure. In this case, in the run-flat tire 1 according to the first embodiment, a portion of the load impeded from being borne by the air pressure can be received by the side reinforcing rubber 50 provided in the sidewall portions 8. In other words, the side reinforcing rubber 50 is formed from a rubber material having a higher strength than the rubber forming the sidewall portions 8, and thus, the side reinforcing rubber 50 can suppress deformation of the sidewall portions 8 in the tire radial direction even in a case where a heavy load in the tire radial direction acts on the sidewall portion 8.

On the other hand, the deflection of the sidewall portions 8 occurring in a case where a load in the tire radial direction acts on the sidewall portions 8 is less significant in the run-flat tire 1 in which the side reinforcing rubber 50 is disposed in the sidewall portions 8 than in a typical pneumatic tire in which the side reinforcing rubber 50 is not disposed in the sidewall portions 8. Thus, during traveling of the vehicle, in a case where a projection protruding from a road surface, such as a stone or the like that is present on the road surface, is treaded by the tread portion 2, the run-flat tire 1 fails to absorb a change in the shape of the road surface due to the presence of the projection, and the projections may penetrate through the tread portion 2 of the run-flat tire 1. In other words, in a case where the projection on the road surface is treaded by the run-flat tire 1 in which the sidewall portions 8 have a high rigidity and are insignificantly deflected under a tire-radial-direction load, the insignificant deflection of the sidewall portions 8 causes the projection to penetrate the tread portion 2, leading to a shock burst.

Figure 5:
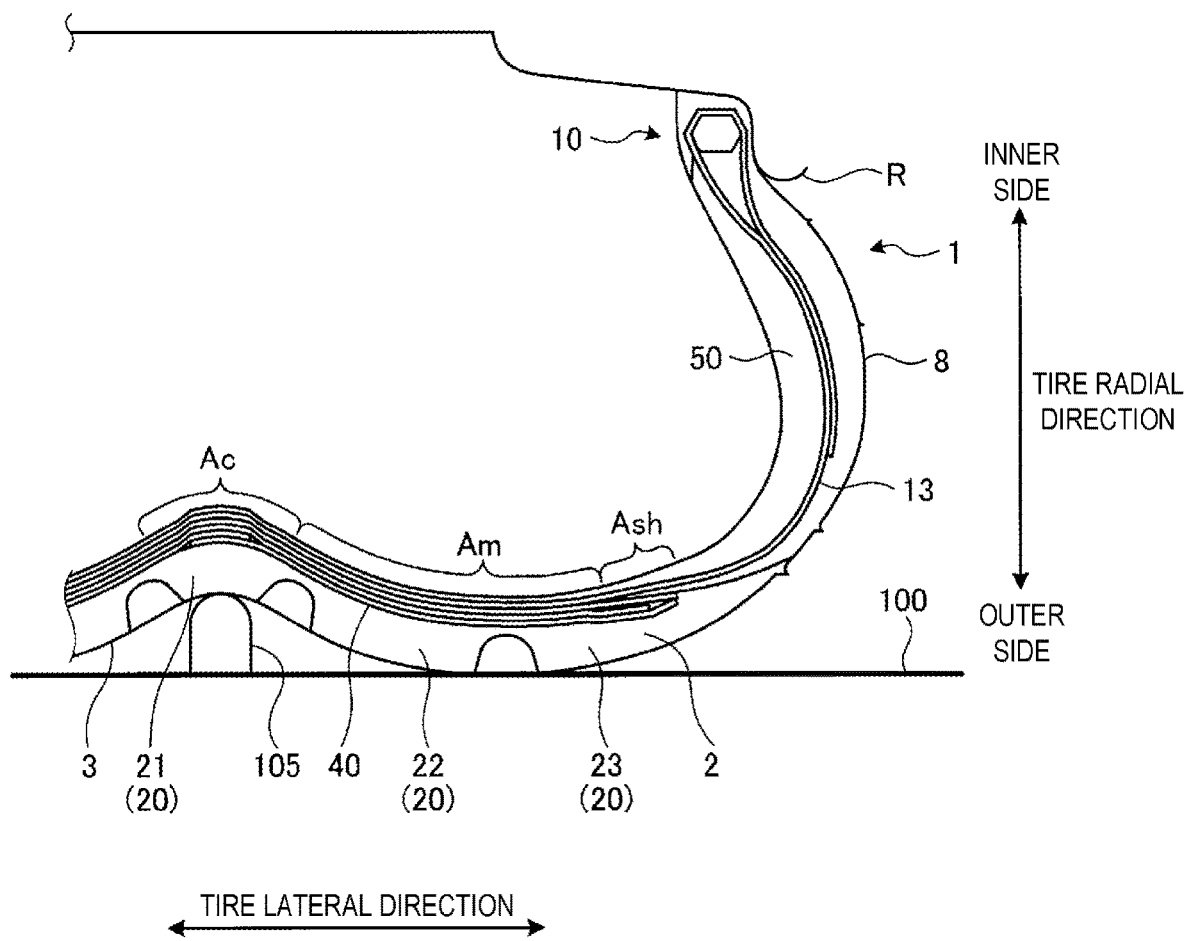
FIG. 5 is an explanatory diagram illustrating that a projection on a road surface is treaded by the run-flat tire according to the first embodiment.

In contrast, in the run-flat tire 1 according to the first embodiment, the center reinforcing portion 41 is provided in the belt reinforcing layer 40 disposed outward of the belt layer 14 in the tire radial direction, and thus the side reinforcing rubber 50 is disposed in the sidewall portions 8 to suppress a possible shock burst in cases where the sidewall portions 8 have a high rigidity. FIG. 5 is an explanatory diagram illustrating that a projection 105 on a road surface 100 is treaded by the run-flat tire 1 according to the first embodiment. The run-flat tire 1 according to the first embodiment is provided with the center reinforcing portion 41 in the belt reinforcing layer 40 to enable an increase in strength at break in a central region of the tread portion 2 in the tire lateral direction. Thus, even in a case where the projection 105 on the road surface 100 is treaded by the vicinity of the center region Ac, penetration of the tread portion 2 by the projection 105 can be suppressed. Additionally, in the belt reinforcing layer 40, the number of band-like members 45 at the positions other than the position of the center region Ac is smaller than the number of band-like members 45 forming the center reinforcing portion 41. Thus, in a case where the projection 105 is treaded by the vicinity of the center region Ac of the tread portion 2, the regions other than the center region Ac can be preferentially deformed. For example, in a case where the projection 105 is treaded by the vicinity of the center region Ac of the tread portion 2, the shoulder regions Ash can be preferentially deformed and thus easily deformed in the direction in which the vicinity of the center region Ac is separated from the road surface 100. This enables a reduction in pressure acting on the tread portion 2 from the projection 105, allowing suppression of penetration of the tread portion 2 by the projection 105. Thus, a possible shock burst can be suppressed that is caused by treading of the projection 105 during traveling of the vehicle.

Additionally, the number of band-like members 45 at the positions other than the position of the center region Ac of the belt reinforcing layer 40 is smaller than the number of band-like members 45 forming the center reinforcing portion 41, and this configuration enables a reduction in energy loss compared to the configuration in which the same number of band-like members 45 as that of band-like members 45 forming the center reinforcing portion 41 are layered over the entire region of the belt reinforcing layer 40. In other words, in a case where the belt reinforcing layer 40 is disposed over the entire range in which the belt layer 14 is disposed to increase the strength at break of the tread portion 2, if a large number of pieces of the band-like member 45 are layered over the entire range of the belt reinforcing layer 40, the belt reinforcing layer 40 has an increased volume, leading to an increased volume of the portion of the run-flat tire 1 that deforms during rotation. Thus, in a case where an increased number of band-like members 45 are provided over the entire range of the belt reinforcing layer 40, the energy loss during rotation of the run-flat tire 1 increases. In contrast, in a case where the number of the band-like member 45 is increased only in the portion of the belt reinforcing layer 40 located in the center region Ac, an increase in volume of the belt reinforcing layer 40 can be suppressed, also allowing suppression an increase in energy loss during rotation of the run-flat tire 1. This enables a reduction in rolling resistance during rotation of the run-flat tire 1.

Furthermore, in the belt reinforcing layer 40, the width Wc of the center reinforcing portion 41 in the tire lateral direction with respect to the thickness Gr of the side reinforcing rubber 50 at the tire maximum width position P is within a range of $0.5 \ Gr \leq Wc \leq 2.0 \ Gr$. This allows improvement of shock burst resistance performance with run-flat durability ensured and further enables a reduction in rolling resistance. In other words, in a case where a relationship between the width Wc of the center reinforcing portion 41 and the thickness Gr of the side reinforcing rubber 50 is $Wc \leq 0.5 \ Gr$, the width Wc of the center reinforcing portion 41 may be excessively small, and the thickness Gr of the side reinforcing rubber 50 may be excessively large. In a case where the width Wc of the center reinforcing portion 41 is excessively small, the strength at break in the central region of the tread portion 2 in the tire lateral direction is difficult to increase, making suppression of a possible shock burst difficult. Additionally, in a case where the thickness Gr of the side reinforcing rubber 50 is excessively large, the sidewall portions 8 have an excessively high rigidity and are more difficult to deflect, and thus the tread portion 2 absorbs an increased rate of the force received from the projection 105 in a case where the projection 105 is treaded by the tread portion 2. This makes suppression of a possible shock burst difficult.

Additionally, in a case where the relationship between the width Wc of the center reinforcing portion 41 and the thickness Gr of the side reinforcing rubber 50 is $Wc > 2.0 \ Gr$, the width Wc of the center reinforcing portion 41 may be excessively large, and the thickness Gr of the side reinforcing rubber 50 may be excessively small. In a case where the width Wc of the center reinforcing portion 41 is excessively large, an increase in volume of the belt reinforcing layer 40 is difficult to suppress, and the energy loss is more likely to increase. Thus, rolling resistance during rotation of the run-flat tire 1 is difficult to reduce. Additionally, in a case where the thickness Gr of the side reinforcing rubber 50 is excessively small, the effect of the side reinforcing rubber 50 reinforcing the sidewall portion 8 is insufficient, and thus, the sidewall portions 8 may be broken due to repeated significant deflection of the sidewall portions 8 during run-flat traveling.

In contrast, in a case where the relationship between the width Wc of the center reinforcing portion 41 and the thickness Gr of the side reinforcing rubber 50 is within the range of $0.5 \ Gr \leq Wc \leq 2.0 \ Gr$, the center reinforcing portion 41 enables an increase in strength at break of the tread portion 2 with an increase in volume of the belt reinforcing layer 40 suppressed. Additionally, with deflection of the sidewall portions 8 allowed to some degree in a case where the projection 105 is treaded by the tread portion 2, the rigidity of the sidewall portions 8 required for run-flat traveling can be ensured by the side reinforcing rubber 50. As a result, the shock burst resistance performance can be improved with the run-flat durability ensured, and furthermore the rolling resistance can be reduced.

Additionally, in the belt reinforcing layer 40, the average width of the width We of the center reinforcing portion 41 is less than 50% of the width WL in the tire lateral direction of the center land portion 21. Accordingly, with an increase in volume of the belt reinforcing layer 40 more reliably suppressed, the center reinforcing portion 41 enables an increase in strength at break of the central region of the tread portion 2 in the tire lateral direction. As a result, the shock burst resistance performance can be more reliably improved, and furthermore the rolling resistance can be reduced.

In addition, since the belt reinforcing layer 40 is formed such that the center reinforcing portion 41 projects inward in the tire radial direction, the thickness of the center reinforcing portion 41 can be increased without a need to reduce the thickness of the tread rubber layer 4 at the same position as that of the center reinforcing portion 41 in the tire lateral direction. Accordingly, the strength at break of the central region of the tread portion 2 in the tire lateral direction can be more reliably increased.

Additionally, since the belt reinforcing layer 40 is formed such that the center reinforcing portion 41 projects inward in the tire radial direction, the portion of the belt layer 14 or the carcass layer 13 disposed along the belt reinforcing layer 40 which portion overlaps with the center reinforcing portion 41 can be shaped to project inward in the tire radial direction. This enables a reduction in tension in the portion of the carcass layer 13 that overlaps with the center reinforcing portion 41. In other words, in a case where the run-flat tire 1 is inflated by air for use, tension is applied to the whole run-flat tire 1 due to the internal pressure, and is mainly borne by the carcass layer 13. Specifically, the carcass layer 13 extends across the pair of bead portions 10 and has a role as the backbone of the run-flat tire 1. Thus, tension caused by the internal pressure is mainly borne by the carcass layer 13. Thus, in an internal-pressure inflated state, a high tensile force acts on the carcass layer 13.

On the other hand, the portion of the carcass layer 13 that overlaps with the center reinforcing portion 41 has a shape that projects inward in the tire radial direction in an internal pressure uninflated state. Thus, in a case where the run-flat tire 1 is used, tension acts on the portion that overlaps with the center reinforcing portion 41 after the run-flat tire 1 is inflated to an internal pressure to cause tension to act on the portions of the carcass layer 13 other than the portion that overlaps with the center reinforcing portion 41. Thus, the portion of the carcass layer 13 that overlaps with the center reinforcing portion 41 can suppress tension caused by the internal pressure even after the run-flat tire 1 is inflated to an internal pressure, and an appropriate amount of deflection of the carcass layer 13 can be ensured when the projection 105 is treaded by the tread portion 2. Accordingly, the appropriate amount of deflection of the tread portion 2 can be ensured in a case where the projection 105 is treaded by the tread portion 2, allowing a possible shock burst to be suppressed. As a result, the shock burst resistance performance can be more reliably improved.

Additionally, in the tread portion 2, the relationship between the average thickness Tc of the tread rubber layer 4 in the center region Ac and the average thickness Tsh of the tread rubber layer 4 in the shoulder regions Ash is within the range of $1.2 \le (Tc/Tsh) \le 1.9$. Thus, with the rolling resistance reduced, a possible shock burst can be suppressed. In other words, if the relationship between the average thickness Tc of the tread rubber layer 4 in the center region Ac and the average thickness Tsh of the tread rubber layer 4 in the shoulder region Ash is $(Tc/Tsh)<1.2$, the average thickness Tc of the tread rubber layer 4 in the center region Ac is too thin, so there is a risk that the strength at break of the center region Ac will be difficult to increase. In another case, because the average thickness Tsh of the tread rubber layer 4 in the shoulder region Ash is too thick, there is a risk that the shoulder regions Ash are less likely to deform when the projections 105 are treaded. Additionally, in a case where the relationship between the average thickness Tc of the tread rubber layer 4 in the center region Ac and the average thickness Tsh of the tread rubber layer 4 in the shoulder regions Ash is $(Tc/Tsh)>1.9$, the average thickness Tc of the tread rubber layer 4 in the center region Ac is excessively large, and the average thickness Tsh of the tread rubber layer 4 in the shoulder regions Ash is excessively small. The central region of the contact patch shape of the ground contact surface 3 in the tire lateral direction has a substantially larger contact length than both end regions of the contact patch shape of the ground contact surface 3 in the tire lateral direction. In this case, in a case where the ground contact surface 3 comes into contact with the ground, only the central region of the tread portion 2 in the tire lateral direction is likely to deflect significantly, and this may be likely to increase the rolling resistance.

In contrast, in a case where the relationship between the average thickness Tc of the tread rubber layer 4 in the center region Ac and the average thickness Tsh of the tread rubber layer 4 in the shoulder regions Ash is within the range of $1.2 \le (Tc/Tsh) \le 1.9$, then with the significant deflection of only the central region of the tread portion 2 in the tire lateral direction suppressed, the strength at break of the center region Ac can be ensured and easiness of deformation of the shoulder regions Ash can be ensured, in a case where the ground contact surface 3 comes into contact with the ground. Accordingly, with the rolling resistance reduced, a possible shock burst can be suppressed, allowing shock burst resistance performance to be improved.

Furthermore, in the tread portion 2, the average thickness Tc of the tread rubber layer 4 in the center region Ac, and the average thickness Tsh of the tread rubber layer 4 in the shoulder regions Ash, and the average thickness Tm of the tread rubber layer 4 in the intermediate region Am satisfy the relationship $Tc \ge Tm > Ts$. Thus, the thickness of the tread rubber layer 4 can be continuously varied from the center region Ac to the intermediate region Am and the shoulder region Ash. Accordingly, the out-of-plane bending rigidity of the tread portion 2 can be more reliably continuously varied along the tire lateral direction, and stress concentration can be more reliably suppressed that is caused by deflection of the tread portion 2 associated with treading of the projection 105 by the tread portion 2. Additionally, the average thickness Tsh of the tread rubber layer 4 in the shoulder regions Ash is smallest, and thus the resistance offered in a case where the shoulder regions Ash are deflected can be more reliably reduced. Accordingly, the energy loss during rotation of the run-flat tire 1 can be reduced, enabling a reduction in rolling resistance. As a result, the shock burst resistance performance can be more reliably improved, and furthermore, the rolling resistance can be reduced.

In addition, a portion of the rubber forming the tread rubber layer 4 that is contained at least in the center region Ac is 10 MPa or more and 16 MPa or less in modulus of 300% elongation. Thus, with the strength of the tread rubber layer 4 ensured, the tread portion 2 can be appropriately deflected. In other words, in a case where the rubber contained in the center region Ac in the tread rubber layer 4 is less than 10 MPa in modulus of 300% elongation, a portion of the rubber located in the center region Ac of the tread rubber layer 4 may be excessively soft. In a case where the projection 105 is treaded by the central region of the tread portion 2 in the tire lateral direction, the projection 105 may penetrate the tread rubber layer 4. In this case, the projection 105 penetrating the tread rubber layer 4 may reach and damage the belt reinforcing layer 40 or the belt layer 14. Additionally, in a case where the rubber contained in the center region Ac in the tread rubber layer 4 is more than 16 MPa in modulus of 300% elongation, the tread portion 2 may be excessively difficult to deflect in a case where the projection 105 is treaded by the tread portion 2. The protrusion of the projection 105 from the road surface 100 may be prevented from being absorbed by deflection of the tread portion 2. In this case, even with the high strength of the tread rubber layer 4, the projection 105 may penetrate the tread rubber layer 4 and damage the belt reinforcing layer 40 or the belt layer 14.

In contrast, in a case where the rubber contained in the center region Ac in the tread rubber layer 4 is 10 MPa or more and 16 MPa or less in modulus of 300% elongation, then with the tread rubber layer 4 provided with a strength sufficient to allow suppression of penetration of the projection 105, the tread portion 2 can be appropriately deflected to allow the protrusion of the projection 105 from the road surface 100 to be absorbed to some degree in a case where the projection 105 is treaded by the tread portion 2. As a result, the shock burst resistance performance can be more reliably improved.

Second Embodiment

The run-flat tire 1 according to a second embodiment has a configuration substantially similar to the configuration of the run-flat tire 1 according to the first embodiment. However, the run-flat tire 1 according to the second embodiment has the feature that at least one land portion 20 is formed as a protrusion-shaped land portion 26. The other components are similar to the corresponding components of the first embodiment, and thus description of the components is omitted and the same reference numerals are used.

Figure 6:
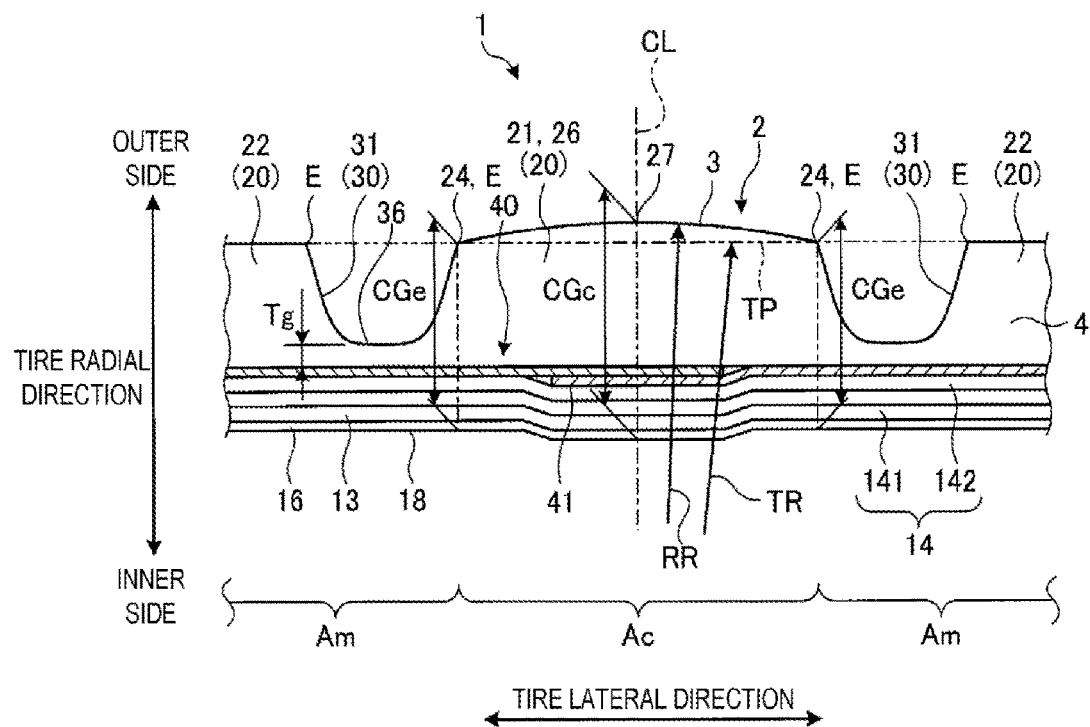
FIG. 6 is a detailed cross-sectional view illustrating a main portion of a run-flat tire according to a second embodiment.

FIG. 6 is a detailed cross-sectional view of a main portion of the run-flat tire 1 according to the second embodiment. In the run-flat tire 1 according to the second embodiment, the belt reinforcing layer 40 includes the center reinforcing portion 41, as is the case with the run-flat tire 1 according to the first embodiment. Additionally, in the run-flat tire 1 according to the second embodiment, at least one of the land portions 20 located in the center region Ac and in the intermediate regions Am is formed as a protrusion-shaped land portion 26 in which a relationship between a thickness CGe of the land portion 20 at the position of an end portion in the tire lateral direction and a thickness CGc of the land portion 20 at a central position in the tire lateral direction is CGc>CGe. In other words, the protrusion-shaped land portion 26 is thicker at the central position in the tire lateral direction than at the positions of both end portions in the tire lateral direction. The thickness in this case is the distance between the ground contact surface 3 and the tire inner surface 18 in a tire meridian cross-sectional view.

In the second embodiment, the center land portion 21 corresponds to the protrusion-shaped land portion 26. The thickness CGe of the center land portion 21 at the position of the end portion in the tire lateral direction corresponds to the distance between the tire inner surface 18 and an intersection point 24 between a groove wall 35 of the center main groove 31 defining the center land portion 21 and the ground contact surface 3 of the center main groove 31. The thickness CGc at the central position in the tire lateral direction corresponds to a distance between the tire inner surface 18 and a central position 27, in the tire lateral direction, of the ground contact surface 3 of the center land portion 21. In the center land portion 21 corresponding to the protrusion-shaped land portion 26, the relationship between the thickness CGe at the position of the end portion in the tire lateral direction and the thickness CGc at the central position in the tire lateral direction is CGc>CGe, the thicknesses CGc and CGe being defined as described above.

Additionally, the center land portion 21 is formed in an arc shape in which the ground contact surface 3 representing an outer profile line of the center land portion 21 in a tire meridian cross-sectional view bulges outward in the tire radial direction. Accordingly, the center land portion 21 is formed as the protrusion-shaped land portion 26 that is thicker at the central position in the tire lateral direction than the positions of both end portions in the tire lateral direction.

Additionally, in the center land portion 21, the ground contact surface 3 is formed projecting outward, in the tire radial direction, from a tread profile TP corresponding to a contour line used as a reference for the ground contact surface 3 of the center land portion 21. Note that the tread profile TP is a standard contour line for the internal-pressure uninflated state, and a comparison between the ground contact surface 3 of the center land portion 21 and the tread profile TP includes a comparison between the shape of the ground contact surface 3 of the center land portion 21 and the tread profile TP in the internal-pressure uninflated state.

In this case, the tread profile TP refers to an arc that passes through at least three of the four opening ends E of the two main grooves 30 adjacent to the land portion 20 and opposite to each other in the tire lateral direction in a tire meridian cross-sectional view of the internal-pressure uninflated state, the center of the arc being located inward of the ground contact surface 3 in the tire radial direction, the arc being drawn with the maximum radius of curvature. In other words, the tread profile TP of the center land portion 21 is an arc that passes through at least three of the four open ends E of the two center main grooves 31 adjacent to opposite sides of the center land portion 21 in the tire lateral direction, and the center of the arc is an arc that is positioned inward in the tire radial direction of the ground contact surface 3 and is drawn with a maximum radius of curvature.

Additionally, for the ground contact surface 3 of the center land portion 21, a radius of curvature RR of an arc corresponding to the shape of the ground contact surface 3 in a tire meridian cross-section view is smaller than a radius of curvature TR of the arc forming the tread profile TP. Specifically, the radius of curvature RR of the ground contact surface 3 of the center land portion 21 in a tire meridian cross-sectional view is within a range of $0.1 \leq (RR/TR) \leq 0.4$ with respect to the radius of curvature TR of the tread profile TP.

Furthermore, in the tread portion 2, a relationship between a minimum thickness Tg of the rubber thickness between the belt reinforcing layer 40 and the groove bottom 36 of the center main groove 31 defining the center land portion 21 and the average thickness Tc of the tread rubber layer 4 located outward, in the tire radial direction, from the belt reinforcing layer 40 in the center region Ac is within a range of $0.12 \leq (Tg/Tc) \leq 0.4$. Note that the relationship between the minimum thickness Tg of the rubber thickness between the groove bottom 36 of the center main groove 31 and the belt layer 14 and the average thickness Tc of the tread rubber layer 4 in the center region Ac is preferably within a range of $0.15 \leq (Tg/Tc) \leq 0.25$.

In the run-flat tire 1 according to the second embodiment, the center land portion 21 is formed as the protrusion-shaped land portion 26 that is thicker at the central position in the tire lateral direction than at the positions of both end portions in the tire lateral direction. Thus, the strength against an external obstacle can be more reliably increased. Thus, even in a case where the projection 105 on the road surface 100 is treaded by the center land portion 21, penetration of the center land portion 21 by the projection 105 can be more reliably suppressed. As a result, the shock burst resistance performance can be more reliably improved.

Additionally, the center land portion 21 corresponding to the protrusion-shaped land portion 26 is formed in an arc shape in which the ground contact surface 3 bulges outward in the tire radial direction, and the relationship between the radius of curvature RR of the ground contact surface 3 and the radius of curvature TR of the tread profile TP is within the range of $0.1 \leq (RR/TR) \leq 0.4$. Thus, with the rolling resistance reduced, a possible shock burst can be suppressed. In other words, in a case where the radius of curvature RR of the ground contact surface 3 of the center land portion 21 with respect to the radius of curvature TR of the tread profile TP is represented as $(RR/TR) < 0.1$, the radius of curvature RR of the ground contact surface 3 is excessively small. Thus, the ground contact surface 3 of the center land portion 21 may excessively significantly bulge outward in the tire radial direction with respect to the tread profile TP. In this case, the central region, in the tire lateral direction, of the contact patch shape of the entire ground contact surface 3 of the tread portion 2 has a significantly larger contact length than both end regions of the contact patch shape in the tire lateral direction, making only the central region in the tire lateral direction likely to deflect significantly in a case where the tread portion 2 comes into contact with the ground. This may be likely to increase the rolling resistance. Additionally, in a case where the radius of curvature RR of the ground contact surface 3 of the center land portion 21 with respect to the radius of curvature TR of the tread profile TP is represented as $(RR/TR) > 0.4$, the radius of curvature RR of the ground contact surface 3 is excessively large. Thus, the ground contact surface 3 of the center land portion 21 may excessively insignificantly bulge outward in the tire radial direction. In this case, properly ensuring the tire thickness of the center region Ac is difficult, and increasing the strength at break of the center region Ac may be difficult. This may lead to difficulty in appropriately improving the shock burst resistance performance.

In contrast, in a case where the relationship between the radius of curvature RR of the ground contact surface 3 of the center land portion 21 and the radius of curvature TR of the tread profile TP is within the range of $0.1 \leq (RR/TR) \leq 0.4$, then with the significant deflection of only the central region of tread portion 2 in the tire lateral direction suppressed, the strength at break of the center region Ac can be ensured in a case where the tread portion 2 comes into contact with the ground. As a result, the shock burst resistance performance can be more reliably improved, and furthermore the rolling resistance can be reduced.

Additionally, in the tread portion 2, the relationship between the minimum thickness Tg of the rubber thickness between the groove bottom 36 of the center main groove 31 and the belt reinforcing layer 40 and the average thickness Tc of the tread rubber layer 4 of the center region Ac is within the range of $0.12 \leq (Tg/Tc) \leq 0.4$. Thus, with energy loss during rotation of the run-flat tire 1 reduced, significant local deformation of the tread portion 2 can be suppressed. In other words, in a case where the minimum thickness Tg of the rubber thickness between the groove bottom 36 of the center main groove 31 and the belt reinforcing layer 40 with respect to the average thickness Tc of the tread rubber layer 4 of the center region Ac is represented as $(Tg/Tc) < 0.12$, the minimum thickness Tg between the center main groove 31 and the belt reinforcing layer 40 is excessively small. Thus, in a case where the tread portion 2 treads the projection 105 and is subjected to bending displacement, excessively significant deformation may occur at the position of the center main groove 31. In this case, the tread portion 2 deforms locally, and thus the tread portion 2 may be likely to be damaged, and improving the shock burst resistance performance may be difficult. Additionally, in a case where the minimum thickness Tg of the rubber thickness between the groove bottom 36 of the center main groove 31 and the belt reinforcing layer 40 with respect to the average thickness Tc of the tread rubber layer 4 of the center region Ac is represented as $(Tg/Tc) > 0.4$, the minimum thickness Tg of the rubber thickness between the center main groove 31 and the belt reinforcing layer 40 is excessively large. Thus, the energy loss during rotation of the run-flat tire 1 is likely to increase, and reducing the rolling resistance may be difficult.

In contrast, in a case where the relationship between the minimum thickness Tg of the rubber thickness between the groove bottom 36 of the center main groove 31 and the belt reinforcing layer 40 and the average thickness Tc of the tread rubber layer 4 of the center region Ac is within a range of $0.12 \leq (Tg/Tc) \leq 0.4$, then with the energy loss during rotation of the run-flat tire 1 reduced, significant local deformation of the tread portion 2 at the position of the center main groove 31 can be suppressed in a case where the projection 105 is treaded by the tread portion 2. As a result, the shock burst resistance performance can be more reliably improved, and furthermore, the rolling resistance can be reduced.

Third Embodiment

The run-flat tire 1 according to a third embodiment has a configuration substantially similar to the configuration of the run-flat tire 1 according to the first embodiment. However, the run-flat tire 1 according to the third embodiment has the feature that a circumferential narrow groove 60 is formed in the shoulder regions Ash. The other components are similar to the corresponding components of the first embodiment, and thus description of the components is omitted and the same reference numerals are used.

Figure 7:
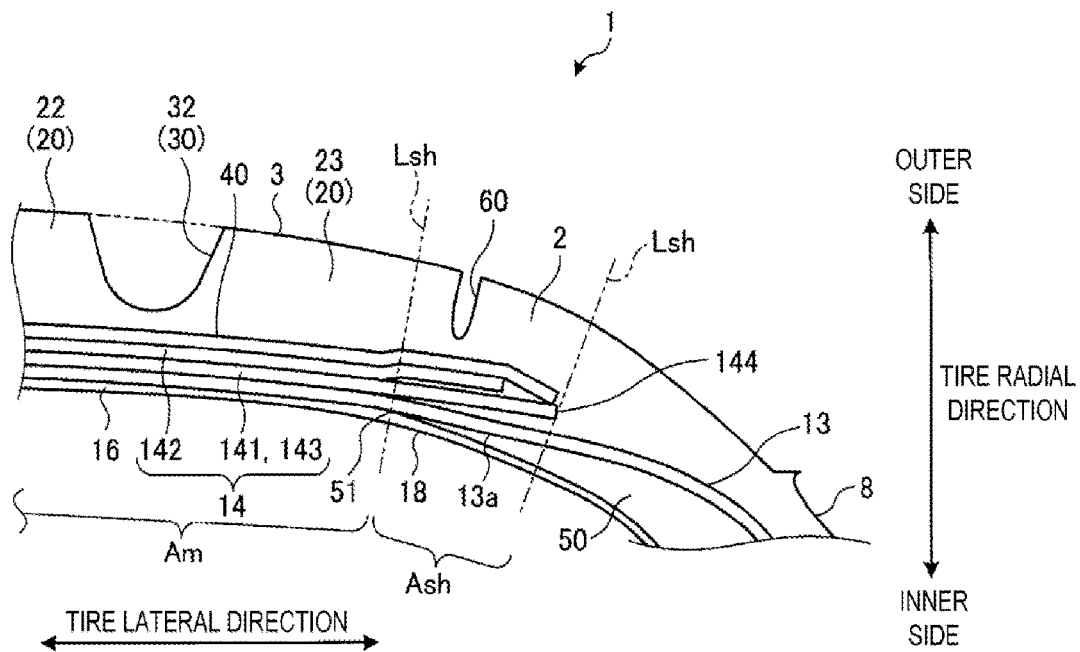
FIG. 7 is a detailed cross-sectional view illustrating a main portion of a run-flat tire according to a third embodiment.

FIG. 7 is a detailed cross-sectional view of a main portion of the run-flat tire 1 according to the third embodiment. In the run-flat tire 1 according to the third embodiment, the belt reinforcing layer 40 includes the center reinforcing portion 41, as is the case with the run-flat tire 1 according to the first embodiment. Additionally, in the run-flat tire 1 according to the third embodiment, the circumferential narrow groove 60 extending in the tire circumferential direction is formed in at least one of the shoulder land portions 23 located on the opposite sides in the tire lateral direction. Specifically, the circumferential narrow groove 60 is disposed in the shoulder region Ash in the shoulder land portion 23. In other words, the circumferential narrow groove 60 is formed in at least one of the shoulder regions Ash located on the opposite sides in the tire lateral direction. The circumferential narrow groove 60 formed in the shoulder region Ash includes an opening portion extending to the ground contact surface 3 and having a groove width of 0.8 mm or more and 2 mm or less and a groove depth of 3 mm or more and 5 mm or less.

Furthermore, in the run-flat tire 1 according to the third embodiment, portions of the carcass layer 13 located in the shoulder regions Ash bulge toward the tire inner surface 18 in the internal-pressure uninflated state. In other words, in the carcass layer 13 in the internal-pressure uninflated state, the most of a portion of the carcass layer 13 located in the tread portion 2 bulges outward in the tire radial direction, and the most of a portion of the carcass layer 13 located in the sidewall portion 8 bulges outward in the tire lateral direction. Specifically, in the carcass layer 13, most portions of the carcass layer 13 other than the bead portion 10 bulge toward the tire outer side surface in the internal-pressure uninflated state for the run-flat tire 1, whereas portions of the carcass layer 13 located in the shoulder regions Ash are formed bulging toward the tire inner surface 18. The carcass layer 13 includes inward bulging portions 13a in portions of the layer 13 located at the shoulder regions Ash, the inward bulging portions 13a bulging toward the tire inner surface 18 as described above in the internal-pressure uninflated state.

In a case where the run-flat tire 1 according to the third embodiment is used, as is the case with the run-flat tire 1 according to the first embodiment, the run-flat tire 1 is mounted on the rim wheel R by fitting the rim wheel R to the bead portion 10, and is then inflated by air. Thus, high tension acts on the carcass layer 13. At this time, the carcass layer 13 includes an inward bulging portion 13a in a portion of the carcass layer 13 located in the shoulder region Ash, the tension acting on the carcass layer 13 can be reduced.

After the run-flat tire 1 is inflated to an internal pressure to cause tension to act on the carcass layer 13 according to the third embodiment, the inward bulging portion 13a of the carcass layer 13 is shaped to bulge toward the tire outer side surface due to the internal pressure. Subsequently, tension acts on the inward bulging portion 13a. Thus, even after the internal-pressure inflation, the inward bulging portion 13a of the carcass layer 13 can keep the tension acting due to the internal pressure low, enabling a reduction in bending rigidity at or near the shoulder regions Ash. Accordingly, in a case where the projection 105 is treaded by the vicinity of the center region Ac of the tread portion 2, the shoulder regions Ash can be more reliably preferentially deformed, enabling a reduction in pressure applied to the tread portion 2 by the projection 105. As a result, the shock burst resistance performance can be more reliably improved.

Additionally, in the run-flat tire 1 according to the third embodiment, since the circumferential narrow groove 60 is formed in the shoulder region Ash, the rigidity of the shoulder region Ash in the shoulder land portion 23 can be reduced. Thus, in a case where a load acts on the shoulder region Ash, possible strain can be relieved. This enables a more reliable reduction in energy loss in the shoulder regions Ash where, while the vehicle is traveling, the energy loss during rotation of the run-flat tire 1 is likely to increase. Accordingly, the resistance offered in a case where the shoulder regions Ash deflect can be more reliably reduced, and thus the energy loss during rotation of the run-flat tire 1 can be reduced, enabling a reduction in rolling resistance.

Additionally, the circumferential narrow groove 60 formed in the shoulder region Ash allows the shoulder region Ash to deform preferentially in a case where the projection 105 is treaded by the vicinity of the center region Ac of the tread portion 2, allowing the whole tread portion 2 to deflect. This enables a reduction in pressure applied to the tread portion 2 by the projection 105. Accordingly, a possible shock burst can be suppressed. As a result, the shock burst resistance performance can be more reliably improved, and furthermore, the rolling resistance can be reduced.

Modified Examples

Figure 8:
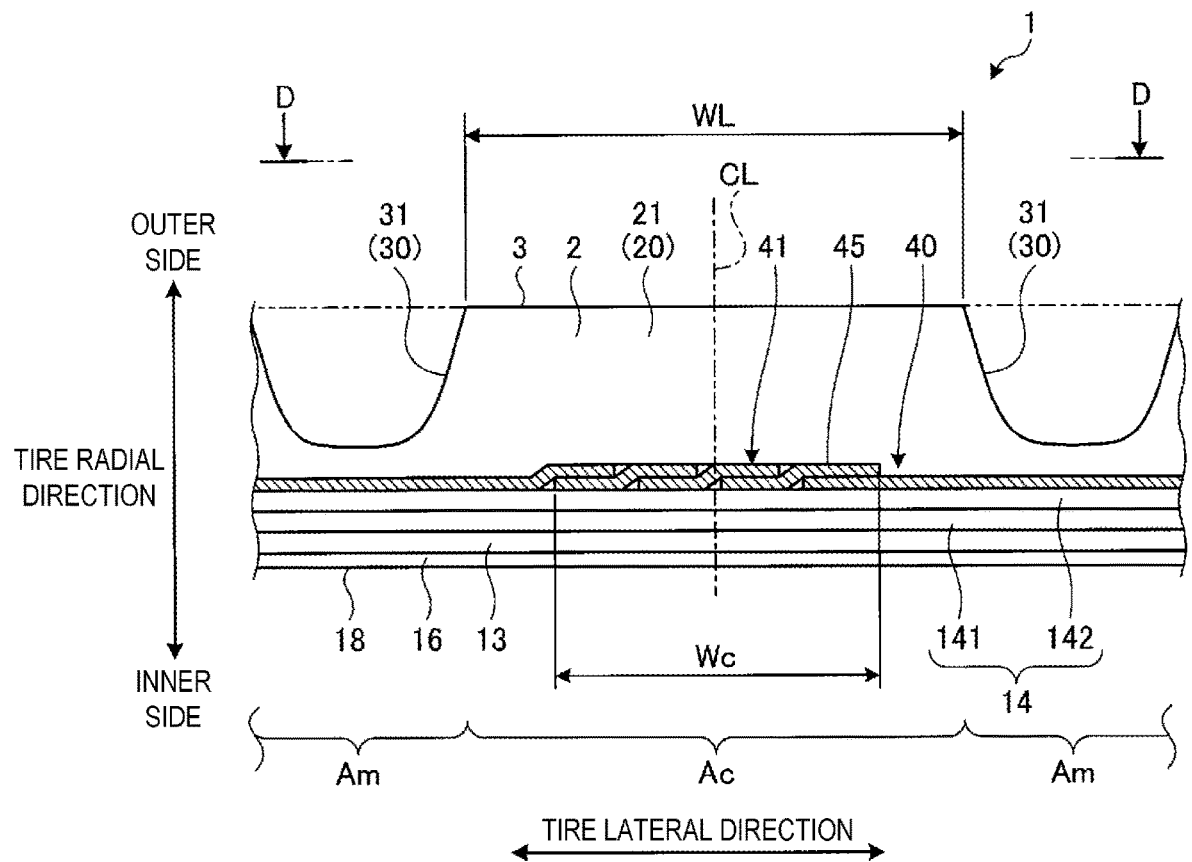
FIG. 8 is a meridian cross-sectional view of the center region of the tread portion in a modified example of the run-flat tire according to the first embodiment.
Figure 9:
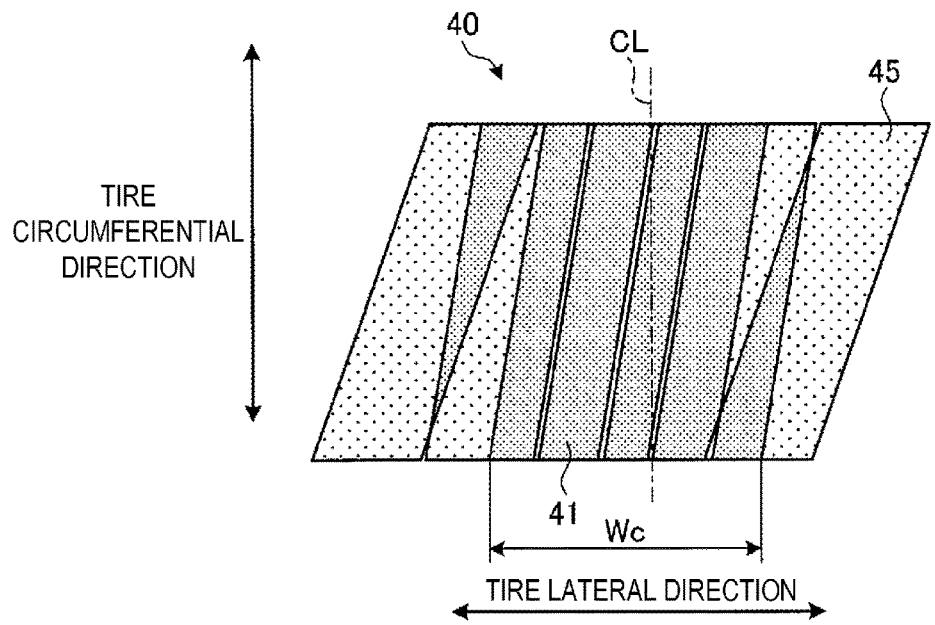
FIG. 9 is a schematic view of a belt reinforcing layer in the direction of arrow D-D in FIG. 8.

Note that in the first embodiment described above, the belt reinforcing layer 40 is formed by spirally winding a pair of band-like members 45, but the belt reinforcing layers 40 may be formed in other forms. FIG. 8 is a modified example of the run-flat tire 1 according to the first embodiment, and is a meridian cross-sectional view of the center region Ac of the tread portion 2. FIG. 9 is a schematic view of the belt reinforcing layer 40 in the direction of arrow D-D in FIG. 8. As illustrated in FIG. 8 and FIG. 9, for example, the belt reinforcing layer 40 may be disposed by winding a single band-like member 45 from one end portion 144 to the other end portion 144 of the belt reinforcing layer 40 in a spiral shape centered at the tire rotation axis. In this case, the center reinforcing portion 41 is formed by reducing the inclination angle, with respect to the tire circumferential direction, of the spiral of the band-like member 45 in the tire lateral direction, at the position of the tire equatorial plane CL region or in the center region Ac, such that adjacent spiral pieces of the band-like member 45 overlap with each other in the tire radial direction.

In other words, the band-like member 45 that is wound in a spiral shape is disposed such that, at the positions other than the position of the center region Ac, different spiral pieces of the band-like member 45 do not overlap with one another, whereas, at the position of the center region Ac, different spiral pieces of the band-like member 45 overlap with one another and are disposed in layers in the tire radial direction. Accordingly, in the belt reinforcing layer 40, more pieces of the band-like member 45 can be layered at the position of the center region Ac than the positions other than the position of the center region Ac. Thus, the center reinforcing portion 41 can be formed at the position of the center region Ac.

Alternatively, in the belt reinforcing layer 40, one band-like member 45 may be disposed from one end portion 144 to the other end portion 144 of the belt reinforcing layer 40, and another band-like member 45 may be disposed exclusively in the center region Ac to form the center reinforcing portion 41 at the position of the center region Ac. Any method may be used to form the belt reinforcing layer 40 as long as the method allows the center reinforcing portion 41 to be formed by layering more pieces of the band-like member 45 at the position of the center region Ac than the portions other than the position of the center region Ac as described above.

Additionally, in the above-described first embodiment, the portions of the belt reinforcing layer 40 other than the center reinforcing portion 41 are formed from one band-like member 45, and the center reinforcing portion 41 is formed by layering two band-like members 45. However, different numbers of pieces of the band-like members 45 may be used to form the belt reinforcing layer 40. For example, the belt reinforcing layer 40 may be formed by layering two pieces of the band-like member 45 in the portions other than the center reinforcing portion 41 while layering three pieces of the band-like member 45 in the center reinforcing portion 41. Any number of the belt reinforcing layers 40 may be used as long as the number of pieces of the band-like member 45 in the center reinforcing portion 41 is larger than the number of pieces of the band-like member 45 in the portions other than the center reinforcing portion 41.

Note that, in the above-described first embodiment, four main grooves 30 are formed but that the number of the main grooves 30 may be different from four. Additionally, in the above-described first embodiment, the center region Ac coincides with the range, in the tire lateral direction, of the center land portion 21 corresponding to the land portion 20 located on the tire equatorial plane CL. However, the center region Ac need not be located on the tire equatorial plane CL. For example, in a case where the main groove 30 is located on the tire equatorial plane CL, the center region Ac may correspond to a range, in the tire lateral direction, of the land portion 20 which range is defined by the main groove 30 located on the tire equatorial plane CL and the main groove 30 second closest to the tire equatorial plane CL. In other words, it is sufficient that a portion of the region interposed between two adjacent main grooves 30 which portion is closest to the tire equatorial plane CL is used as the center region Ac.

Additionally, in a case where the position of center of the center region Ac in the tire lateral direction differs from the position of the tire equatorial plane CL in the tire lateral direction, the intermediate regions Am located on the opposite sides of the tire equatorial plane CL in the tire lateral direction may have different widths in the tire lateral direction. In this case, the tire average thickness Gm in the intermediate regions Am has an average value for the intermediate regions Am located on the opposite sides of the tire equatorial plane CL in the tire lateral direction.

Additionally, in the above-described first embodiment, the rubber of the tread rubber layer 4 located in the center region Ac is 10 MPa or more and 16 MPa or less in modulus of 300% elongation. However, for the rubber forming the tread rubber layer 4, the rubber located in the regions other than the center region Ac may also be 10 MPa or more and 16 MPa or less in modulus of 300% elongation.

Additionally, in the second embodiment described above, the center land portion 21 corresponds to the protrusion-shaped land portion 26. However, any of the land portions 20 other than the center land portion 21 may be formed as the protrusion-shaped land portion 26. For example, the second land portions 22 located in the intermediate regions Am may be formed as the protrusion-shaped land portions 26, or both the center land portion 21 located in the center region Ac and each of the second land portions 22 positioned in the intermediate regions Am may be formed as the protrusion-shaped land portions 26. In the tread portion 2, at least one of the land portions 20 located in the center region Ac and the intermediate regions Am may be formed as the protrusion-shaped land portion 26.

Additionally, in the third embodiment described above, the circumferential narrow groove 60 formed in the shoulder region Ash may be formed in the shoulder regions Ash on the opposite sides in the tire lateral direction or may be formed in one of the shoulder regions Ash. Additionally, the circumferential narrow groove 60 need not necessarily be formed continuously all around the circumference, and the circumferential narrow groove 60 may be discontinuous in the tire circumferential direction to the extent that the function of the circumferential narrow groove 60 to reduce the rigidity of the shoulder regions Ash is not degraded.

Additionally, in the third embodiment described above, the carcass layer 13 includes the inward bulging portion 13a in the portion located in each shoulder region Ash. However, the inward bulging portion 13a need not clearly bulge toward the tire inner surface 18 in the internal-pressure uninflated state. For example, the inward bulging portion 13a may be formed in a linear shape or in a wavy shape in a tire meridian cross-sectional view in the internal-pressure uninflated state. The inward bulging portion 13a of the carcass layer 13 is shaped to bulge toward the tire outer side surface due to the tension acting on the carcass layer 13 in the internal-pressure inflated state. However, at this time, the inward bulging portion 13a may have any shape as long as the shape enables a reduction in tension in the portion of the carcass layer 13 located in the shoulder region Ash.

Additionally, the above-described first to third embodiments and modified examples may be appropriately combined. In the run-flat tire 1, at least the belt reinforcing layer 40 includes the center reinforcing portion 41, and the width Wc of the center reinforcing portion 41 in the tire lateral direction with respect to the thickness Gr of the side reinforcing rubber 50 at the tire maximum width position P is within the range of $0.5\ Gr \leq Wc \leq 2.0\ Gr$, and thus the shock burst resistance performance can be improved with the run-flat durability ensured, and furthermore the rolling resistance can be reduced.

Examples

FIGS. 10A-10D are tables showing the results of performance evaluation tests of run-flat tires. In relation to the run-flat tire 1 described above, performance evaluation tests will be described below that were conducted on a run-flat tire according to a conventional example, the run-flat tire 1 according to present technology, and a run-flat tire according to a comparative example for comparison with the run-flat tire 1 according to the present technology. The performance evaluation tests were performed on the shock burst resistance, indicating durability against shock bursts, rolling resistance performance indicating performance related to the rolling resistance, and the run-flat durability, indicating durability during run-flat traveling.

The performance evaluation tests were performed using the run-flat tire 1 having a nominal size of 245/50R19 105 W, specified by JATMA, and the run-flat tire 1 was mounted on a JATMA standard rim wheel with a rim size of 19×7.5 J. In the evaluation method for each of the test items, for the shock burst resistance performance, the test tires were inflated to an air pressure of 220 kPa, and plunger destructive tests were conducted at a plunger diameter of 19 mm and at an insertional speed of 50 mm/min accordance with JIS K6302 to measure tire fracture energy. The shock burst resistance is expressed as index values with the conventional example described below being assigned the value of 100. Larger index values indicate higher tire strength and more excellent shock burst resistance.

Additionally, for the rolling resistance performance, the test tires are inflated to 250 kPa, and the rolling resistance was measured after 30 min pre-running at a drum radius of 854 mm, at a speed of 80 km/h, and at a load of 7.26 kN. The rolling resistance performance is expressed as index values each corresponding to the reciprocal of the measured rolling resistance, with the conventional example described below being assigned the value of 100. Larger index values indicate lower rolling resistance.

Additionally, for the run-flat durability, the air pressure of the test tire is set to 0 kPa, and the test tire with an air pressure of 0 kPa is mounted on a right front wheel of a 2500-cc passenger car used as a test vehicle. The air pressure of each of a left front wheel and a left and a right rear wheels is set to 200 kPa. A test driver drives the vehicle at a circuit with dry road surfaces at 80 km/h. A traveling distance is measured until the test tire is broken. The run-flat durability is expressed as an index value with the conventional example (described later) being assigned the value of 100, and larger index values indicate less likelihood of a tire failure in a case of traveling at an air pressure of 0 kPa, in turn indicating high run-flat durability.

The performance evaluation tests were conducted on 17 types of run-flat tires including the run-flat tire according to Conventional Example corresponding to an example of conventional run-flat tire, Examples 1 to 14 corresponding to the run-flat tires 1 according to the present technology, and Comparative Examples 1 and 2 corresponding to run-flat tires compared with the run-flat tire 1 according to the present technology. In the run-flat tire of the Conventional Example, the belt reinforcing layer 40 does not include the center reinforcing portion 41, in which more pieces of the band-like member 45 are layered than at the other positions of the belt reinforcing layer 40. Additionally, in the run-flat tires according to Comparative Examples 1 and 2, the width Wc of the center reinforcing portion 41 in the tire lateral direction with respect to the thickness Gr of the side reinforcing rubber 50 at the tire maximum width position P is not within the range of $0.5\ Gr \leq Wc \leq 2.0\ Gr$.

In contrast, in Examples 1 to 14, corresponding to examples of the run-flat tire 1 according to the present technology, the belt reinforcing layer 40 includes the center reinforcing portion 41, and the width Wc of the center reinforcing portion 41 in the tire lateral direction with respect to the thickness Gr of the side reinforcing rubber 50 at the tire maximum width position P is within the range of $0.5\ Gr \leq Wc \leq 2.0\ Gr$. Furthermore, the run-flat tires 1 according to Examples 1 to 14 differ in the average width of the width Wc of the center reinforcing portion 41 with respect to the width WL in the tire lateral direction of the center land portion 21, the configuration of the center reinforcing portion 41, the average thickness Tc of the tread rubber layer 4 in the center region Ac with respect to the average thickness Tsh of the tread rubber layer 4 in the shoulder regions Ash (Tc/Tsh), the average thickness Tm of the tread rubber layer 4 in the intermediate regions Am with respect to the average thickness Tsh of the tread rubber layer 4 in the shoulder regions Ash (Tm/Tsh), the presence of the protrusion-shaped land portion 26, the radius of curvature RR of the ground contact surface 3 of the protrusion-shaped land portion 26 with respect to the radius of curvature TR of the tread profile TP (RR/TR), the minimum thickness Tg of the rubber thickness between the groove bottom 36 of the center main groove 31 and the belt layer 14 with respect to the average thickness Tc of the tread rubber layer 4 in the center region Ac (Tg/Tc), the modulus MPa of 300% elongation of the tread rubber layer 4 in the center region Ac, the presence of the circumferential narrow groove 60 in the shoulder regions Ash, and the presence of the inward bulging portion 13a of the carcass layer 13.

As illustrated in FIGS. 10A-10D, the results of performing performance evaluation tests using these run-flat tires 1 indicate that the run-flat tires 1 according to Examples 1 to 14 can improve the shock burst resistance performance and also reduce the rolling resistance compared to Conventional Example and Comparative Examples 1 and 2 without reducing the run-flat durability compared to Conventional Example and Comparative Examples 1 and 2. In other words, the run-flat tires 1 according to Examples 1 to 14 can improve the shock burst resistance performance with the run-flat durability ensured and can further reduce the rolling resistance.

The invention claimed is:

1. A run-flat tire comprising:
a tread portion;
sidewall portions disposed on opposite sides of the tread portion in a tire lateral direction;
a belt layer disposed in the tread portion;
a belt reinforcing layer disposed outward of the belt layer in a tire radial direction;
a tread rubber layer disposed outward, in the tire radial direction, of the belt reinforcing layer in the tread portion; and
side reinforcing rubber disposed in each of the sidewall portions and including tire radial direction outer end portions located inward of the belt layer in the tire radial direction,
the tread portion being provided with a main groove extending in a tire circumferential direction and defining a plurality of land portions, and
assuming that a center region is a region where a center land portion corresponding to the land portion included in the land portions in the tread portion and located closest to a tire equatorial plane is positioned and that shoulder regions are each a region between the corresponding tire radial direction outer end portion of the side reinforcing rubber and a corresponding end portion of the belt layer in the tire lateral direction and that an intermediate regions are each a region between the center region and the shoulder region,
the belt reinforcing layer including a center reinforcing portion located at a position of the center region and in which more pieces of the belt reinforcing layer are layered than at positions other than the position of the center region, and
in the belt reinforcing layer, a width Wc of the center reinforcing portion in the tire lateral direction with respect to a thickness Gr of the side reinforcing rubber at a tire maximum width position being within a range of $0.5\ Gr \leq Wc \leq 2.0\ Gr$, the width Wc being varied in the tire circumferential direction.

2. The run-flat tire according to claim 1, wherein the belt reinforcing layer is formed such that the center reinforcing portion projects inward in the tire radial direction.

3. The run-flat tire according to claim 1, wherein in the tread portion, a relationship between an average thickness Tc of the tread rubber layer located outward, in the tire radial direction, from the belt reinforcing layer in the center region, an average thickness Tsh of the tread rubber layer located outward, in the tire radial direction, from the belt reinforcing layer in the shoulder regions, and an average thickness Tm of the tread rubber layer located outward, in the tire radial direction, from the belt reinforcing layer in the intermediate regions is within a range of $1.2 \leq (Tc/Tsh) \leq 1.9$ and satisfies a relationship $Tc \geq Tm > Ts$.

4. The run-flat tire according to claim 1, wherein in the tread portion, a relationship between a minimum thickness Tg of a rubber thickness between the belt reinforcing layer and a groove bottom of the main groove defining the center land portion and an average thickness Tc of the tread rubber layer located outward, in the tire radial direction, from the belt reinforcing layer in the center region is within a range of $0.12 \leq (Tg/Tc) \leq 0.4$.

5. The run-flat tire according to claim 1, wherein
a portion of rubber forming the tread rubber layer which portion is contained in the center region is 10 MPa or more and 16 MPa or less in modulus of 300% elongation.

6. The run-flat tire according to claim 1, wherein
a circumferential narrow groove extending in the tire circumferential direction is formed in at least one of the shoulder regions located on opposite sides in the tire lateral direction.

7. The run-flat tire according to claim 1, comprising at least one carcass layer, wherein
a portion of the carcass layer located in the shoulder region bulges toward a tire inner surface in an internal-pressure uninflated state.

8. The run-flat tire according to claim 1, wherein
at least one of the land portions located in the center region and the intermediate regions is formed as a protrusion-shaped land portion for which a relationship between a thickness CGe at an end portion position of the land portion in the tire lateral direction and a thickness CGc at a central position of the land portion in the tire lateral direction is CGc>CGe.

9. The run-flat tire according to claim 8, wherein
the protrusion-shaped land portion is formed in an arc shape in which a ground contact surface representing an outer contour line in a tire meridian cross-sectional view bulges outward in the tire radial direction, and a relationship between a radius of curvature RR of the arc and a radius of curvature TR of an arc forming a tread profile is within a range of 0.1≤(RR/TR)≤0.4.

10. The run-flat tire according to claim 1, wherein
in the belt reinforcing layer, an average width of the width Wc of the center reinforcing portion is less than 50% of a width of the center land portion in the tire lateral direction.

11. The run-flat tire according to claim 10, wherein
the belt reinforcing layer is formed such that the center reinforcing portion projects inward in the tire radial direction.

12. The run-flat tire according to claim 11, wherein
in the tread portion, a relationship between an average thickness Tc of the tread rubber layer located outward, in the tire radial direction, from the belt reinforcing layer in the center region, an average thickness Tsh of the tread rubber layer located outward, in the tire radial direction, from the belt reinforcing layer in the shoulder regions, and an average thickness Tm of the tread rubber layer located outward, in the tire radial direction, from the belt reinforcing layer in the intermediate regions is within a range of 1.2≤(Tc/Tsh)≤1.9 and satisfies a relationship Tc≥Tm>Ts.

13. The run-flat tire according to claim 12, wherein
at least one of the land portions located in the center region and the intermediate regions is formed as a protrusion-shaped land portion for which a relationship between a thickness CGe at an end portion position of the land portion in the tire lateral direction and a thickness CGc at a central position of the land portion in the tire lateral direction is CGc>CGe.

14. The run-flat tire according to claim 13, wherein
the protrusion-shaped land portion is formed in an arc shape in which a ground contact surface representing an outer contour line in a tire meridian cross-sectional view bulges outward in the tire radial direction, and a relationship between a radius of curvature RR of the arc and a radius of curvature TR of an arc forming a tread profile is within a range of 0.1≤(RR/TR)≤0.4.

15. The run-flat tire according to claim 14, wherein
in the tread portion, a relationship between a minimum thickness Tg of a rubber thickness between the belt reinforcing layer and a groove bottom of the main groove defining the center land portion and the average thickness Tc of the tread rubber layer located outward, in the tire radial direction, from the belt reinforcing layer in the center region is within a range of 0.12≤(Tg/Tc)≤0.4.

16. The run-flat tire according to claim 15, wherein
a portion of rubber forming the tread rubber layer which portion is contained in the center region is 10 MPa or more and 16 MPa or less in modulus of 300% elongation.

17. The run-flat tire according to claim 16, wherein
a circumferential narrow groove extending in the tire circumferential direction is formed in at least one of the shoulder regions located on opposite sides in the tire lateral direction.

18. The run-flat tire according to claim 17, comprising at least one carcass layer, wherein
a portion of the carcass layer located in the shoulder region bulges toward a tire inner surface in an internal-pressure uninflated state.

* * * * *